United States Patent
Naughton et al.

(10) Patent No.: US 10,636,425 B2
(45) Date of Patent: Apr. 28, 2020

(54) VOICE APPLICATION PLATFORM

(71) Applicant: Voicify, LLC, Boston, MA (US)

(72) Inventors: Robert T. Naughton, Wellesley, MA (US); Nicholas G. Laidlaw, Needham, MA (US); Alexander M. Dunn, Boston, MA (US); Jeffrey K. McMahon, Boston, MA (US)

(73) Assignee: Voicify, LLC, Boston, MA (US)

( * ) Notice: Subject to any disclaimer, the term of this patent is extended or adjusted under 35 U.S.C. 154(b) by 0 days.

(21) Appl. No.: 16/000,799

(22) Filed: Jun. 5, 2018

(65) Prior Publication Data
US 2019/0371313 A1    Dec. 5, 2019

(51) Int. Cl.
*G10L 15/22*    (2006.01)
*G10L 15/30*    (2013.01)
*H04M 3/493*    (2006.01)

(52) U.S. Cl.
CPC .............. *G10L 15/22* (2013.01); *G10L 15/30* (2013.01); *H04M 3/4936* (2013.01)

(58) Field of Classification Search
CPC ....... G10L 15/228; G10L 15/00; G10L 15/08; G10L 15/16; G10L 15/18; G10L 15/20; G10L 15/22; G10L 15/222; G10L 15/24; G10L 15/26; G10L 15/28; G10L 15/30; G10L 15/32; G10L 2015/22; G10L 2015/00; G10L 2015/06; G10L 2015/08; G10L 2015/221; G10L 2015/223; G10L 2015/225; G10L 2015/226; G10L 2015/228

USPC .... 704/270, 231, 235, 246, 251, 257, 270.1, 704/275, 276
See application file for complete search history.

(56) References Cited

U.S. PATENT DOCUMENTS

| | | |
|---|---|---|
| 6,182,045 B1 | 1/2001 | Kredo |
| 7,206,391 B2 | 4/2007 | Chiu |
| 7,233,933 B2 | 6/2007 | Horvitz |
| 8,451,823 B2 | 5/2013 | Ben-David |
| 8,467,354 B1 | 6/2013 | Jerkunica |
| 9,189,742 B2 | 11/2015 | London |
| 9,368,105 B1 | 6/2016 | Freed |

(Continued)

OTHER PUBLICATIONS

Pullstring Converse, Amazon Alexa, "Converse empowers team to design, protype, and publish voice apps for Google Assistant, and IoT devices", Engage Customers with Interactive Voice Applications, PullString, Jun. 5, 2018 (2 pages).

(Continued)

*Primary Examiner* — Qi Han
(74) *Attorney, Agent, or Firm* — Fish & Richardson P.C.

(57) ABSTRACT

Among other things, requests are received from voice assistant devices expressed in accordance with different corresponding protocols of one or more voice assistant frameworks. Each of the requests represents a voiced input by a user to the corresponding voice assistant device. The received requests are re-expressed in accordance with a common request protocol. Based on the received requests, responses to the requests are expressed in accordance with a common response protocol. Each of the responses is re-expressed according to a protocol of the framework with respect to which the corresponding request was expressed. The responses are sent to the voice assistant devices for presentation to the users.

28 Claims, 31 Drawing Sheets

(56) References Cited

U.S. PATENT DOCUMENTS

Figure 1:
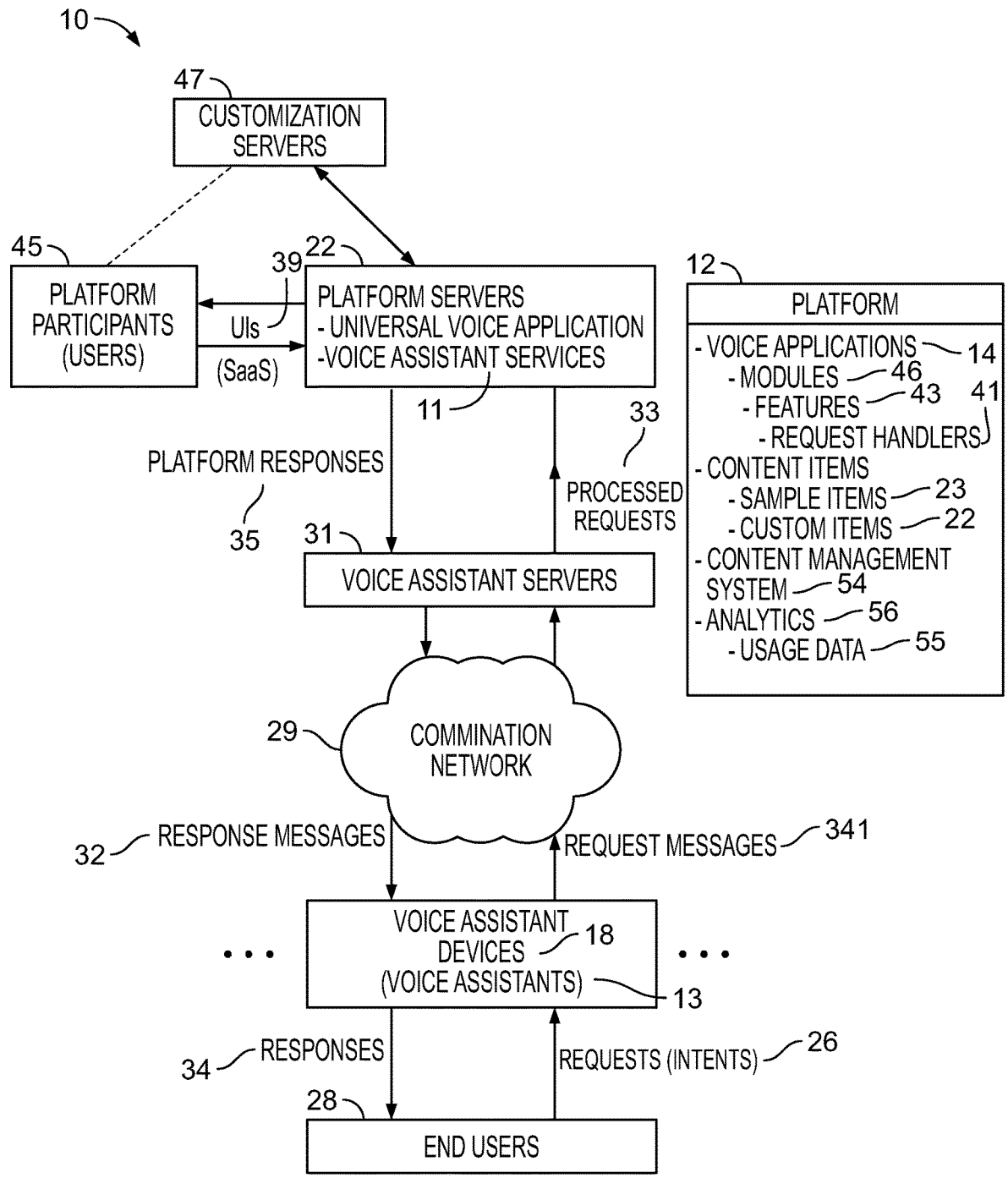

| | | | |
|---|---|---|---|
| 9,460,715 | B2 | 10/2016 | Hart |
| 9,886,955 | B1 | 2/2018 | Tretreault |
| 10,032,452 | B1 | 7/2018 | Bhaya |
| 1,023,599 | A1 | 3/2019 | Naughton et al. |
| 2003/0023953 | A1 | 1/2003 | Lucassen |
| 2004/0073430 | A1 | 4/2004 | Desal |
| 2004/0086095 | A1 | 5/2004 | Dixit |
| 2005/0091057 | A1 | 4/2005 | Phillips |
| 2005/0119892 | A1 | 6/2005 | Agapi |
| 2005/0125232 | A1 | 6/2005 | Gadd |
| 2005/0203747 | A1 | 9/2005 | Lecoeuche |
| 2005/0204309 | A1 | 9/2005 | Szeto |
| 2006/0074658 | A1 | 4/2006 | Chadha |
| 2006/0287854 | A1* | 12/2006 | Smolenski ............ G10L 15/22 704/231 |
| 2007/0006082 | A1 | 1/2007 | Potter |
| 2007/0047719 | A1 | 3/2007 | Dhawan et al. |
| 2008/0183578 | A1 | 7/2008 | Lipscomb |
| 2008/0270110 | A1 | 10/2008 | Yurick |
| 2009/0006660 | A1 | 1/2009 | Bawcutt |
| 2009/0049393 | A1 | 2/2009 | Khosla et al. |
| 2009/0089064 | A1 | 4/2009 | Bachleda |
| 2009/0299745 | A1 | 12/2009 | Kennewick |
| 2010/0023553 | A1 | 1/2010 | Gausman |
| 2011/0267985 | A1* | 11/2011 | Wilkinson .......... H04M 1/2535 370/259 |
| 2012/0240045 | A1 | 9/2012 | Bradley |
| 2012/0278169 | A1 | 11/2012 | Lau |
| 2012/0323925 | A1 | 12/2012 | Fitzsimmons |
| 2013/0183944 | A1 | 7/2013 | Mozer |
| 2013/0238326 | A1 | 9/2013 | Kim |
| 2014/0163978 | A1 | 6/2014 | Basye |
| 2014/0164476 | A1 | 6/2014 | Thomson |
| 2014/0254435 | A1* | 9/2014 | Menendez ............ H04W 28/24 370/259 |
| 2014/0274203 | A1 | 9/2014 | Ganong, III |
| 2014/0279762 | A1 | 9/2014 | Xaypanya |
| 2014/0279770 | A1 | 9/2014 | Xaypanya |
| 2014/0281628 | A1 | 9/2014 | Nigam |
| 2014/0337131 | A1 | 11/2014 | Edara |
| 2015/0006184 | A1 | 1/2015 | Marti |
| 2015/0066817 | A1 | 3/2015 | Slayton |
| 2015/0142704 | A1 | 5/2015 | London |
| 2015/0279366 | A1 | 10/2015 | Krestnikov |
| 2016/0098992 | A1 | 4/2016 | Renard |
| 2016/0104480 | A1 | 4/2016 | Sharifi |
| 2016/0110422 | A1 | 4/2016 | Roytman |
| 2016/0155442 | A1 | 6/2016 | Kannan |
| 2016/0173578 | A1 | 6/2016 | Sharma |
| 2016/0260135 | A1 | 9/2016 | Zomet |
| 2017/0244834 | A1* | 8/2017 | Flores ................. H04M 3/4936 |
| 2017/0269975 | A1 | 9/2017 | Wood |
| 2017/0329573 | A1 | 11/2017 | Mixter |
| 2017/0358303 | A1 | 12/2017 | Walker, II |
| 2018/0039478 | A1 | 2/2018 | Sung et al. |
| 2018/0040324 | A1 | 2/2018 | Wilberding |
| 2018/0052664 | A1 | 2/2018 | Zhang |
| 2018/0052884 | A1 | 2/2018 | Kale |
| 2018/0061420 | A1 | 3/2018 | Patil |
| 2018/0096675 | A1 | 4/2018 | Nygaard |
| 2018/0108343 | A1 | 4/2018 | Stevans |
| 2018/0122378 | A1 | 5/2018 | Mixter et al. |
| 2018/0130469 | A1 | 5/2018 | Gruenstein |
| 2018/0143989 | A1 | 5/2018 | Nomula |
| 2018/0152557 | A1 | 5/2018 | White |
| 2018/0184152 | A1 | 6/2018 | Kirkpatrick |
| 2018/0293484 | A1 | 10/2018 | Wang |
| 2018/0301147 | A1 | 10/2018 | Kim |
| 2018/0367445 | A1* | 12/2018 | Bajaj .................... H04L 41/142 |
| 2019/0028587 | A1 | 1/2019 | Unitt |
| 2019/0371312 | A1 | 12/2019 | Naughton et al. |
| 2019/0371314 | A1 | 12/2019 | Naughton et al. |
| 2019/0371321 | A1 | 12/2019 | Naughton et al. |

OTHER PUBLICATIONS

Sayspring, "Software to design the future", https://sayspring.com, Jun. 5, 2018 (1 page).

WitLingo, "Voice Enable Your Brand in Days", Launch your brand on Alexa, Google Assistant, and Cortana on time and on budget, Jun. 5, 2018 (2 pages).

U.S. Non-Final Office Action dated Sep. 19, 2018 for U.S. Appl. No. 16/000,789; 21 pages.

Lin et al., "A distributed architecture for cooperative spoken dialogue agents with coherent dialogue state and history," Department of Electrical Engineering, National Taiwan University, 1999, 4 pages.

USPTO transaction history, appliation as filed and pending claims of U.S. Appl. No. 16/000,789.

USPTO transaction history, appliation as filed and pending claims of U.S. Appl. No. 16/353,977.

USPTO transaction history, application as filed and pending claims of U.S. Appl. No. 16/000,798.

USPTO transaction history, application as filed and pending claims of U.S. Appl. No. 16/000,799.

Etherington, "Amazon develops a new way to help Alexa answer complex questions" Tech Crunch, Jul. 31, 2019, retrieven from URL <https://techcrunch.com/2019/07/31/amazon-develops-a-new-way-to-help-alexa-answer-complex-questions/>, 5 pages.

Orbita.ai [online], "Orbita Voice Dialog Editor", retrieved on Aug. 2, 2019, retrieved from URL <https://orbita.ai/orbita-voice-dialog-editor/>, 4 pages.

Speechmarkdown.org [online], "Speech Markdown", retrieved on Aug. 2, 2019, retrieved from URL<https://www.speechmarkdown.org/>, 3 pages.

USPTO transaction history, application as filed and pending claims of U.S. Appl. No. 16/000,789.

USPTO transaction history, application as filed and pending claims of U.S. Appl. No. 16/353,977.

USPTO transaction history, application as filed and pending claims of U.S. Appl. No. 16/000,805.

U.S. Appl. No. 16/000,789 filed Jun. 5, 2018—Pending.

U.S. Appl. No. 16/000,798, filed Jun. 5, 2018, now U.S Pat No. 10,235,999—Issued, No—10235999 submitted on May 16, 2019, No. 10235999 submitted on May 16, 2019, No. 10235999 submitted on May 16, 2019.

U.S. Appl. No. 16/353,977, filed Mar. 14, 2019—Pending.

U.S. Appl. No 16/000,805, filed Jun. 5, 2018—Pending.

D'Haro et al., "An advanced platform to speed up the design of multilingual dialog applications for multiple modalities", Speech Communication 48.8, Aug. 2006, pp. 863-887.

Kumar et al., "Just ask: Building an architecture for extensible self-service spoken language understanding" arXiv preprint 1711.00549, Mar. 2018, pp. 1-13.

McTear et al., "Voice application development for Android" Packt Publishing Ltd., Dec. 2013, pp. 1-113.

U.S. Appl. No. 16/00,789, filed Jun. 5, 2018—Pending, No. submitted on Aug. 5, 2019, No. submitted on Aug. 5, 2019, No. submitted on Aug. 5, 2019.

U.S. Appl. No. 16/000,798, filed Jun. 5, 2018, now U.S. Pat. No. 10,235,99—Issued, No. submitted on Aug. 5, 2019, No. submitted on Aug. 5, 2019, No. submitted on Aug. 5, 2019.

U.S. Appl. No. 16/353,977, filed Mar. 14, 2019—Pending, No. submitted on Aug. 5, 2019, No. submitted on Aug. 5, 2019, No. submitted on Aug. 5, 2019.

U.S. Appl. No. 16/000,799, filed Jun. 5, 2018—Pending, No. submitted on Aug. 5, 2019, No. submitted on Aug. 5, 2019, No. submitted on Aug. 5, 2019.

U.S. Appl. No. 16/000,805, filed Jun. 5, 2018—Pending, No. submitted on Aug. 5, 2019, No. submitted on Aug. 5, 2019, No. submitted on Aug. 5, 2019.

International Search Report and Written Opinion in International Application No. PCT/US2019/035125, dated Nov. 4, 2019, 16 pages.

USPTO Final Office Action in U.S. Appl. No. 16/000,789, dated Oct. 25, 2019, 14 pages.

(56) References Cited

OTHER PUBLICATIONS

Voicify, "Voicify LLC recieves investment from Martech Ventures to accelerate growth, geographic Expansion, and product development", Cision PR Newswire article, Aug. 15, 2018, retrieved on Sep. 18, 2019, Retrieved from <URL:https://www.prnewswire.com/news-relese/voicify-llc-receives-investment-from-martech-ventures-to-accelerate-growth-geographic-expansion-and-product-development-300697507.html> entire document.

* cited by examiner

```
{
  "assistant": {
    "name": "Alexa",
    "id": "55efcf2f-5d69-41f6-8242-a37118c7dd7a"
  },
  "request_date_utc": "2018-05-01T18:25:43.511Z",
  "feature": {
    "id": "ade9cb33-41b3-46fc-b2f2-482b702739ad",
    "full_name": "Voicify Events",
    "short_code": "events",
    "is_managed": true
  },
  "feature_request": {
    "date": "2018-05-07T15:35:00.000Z",
    "location": "Student Center"
    "event_type": "concert"
  },
  "application" : {
    "id" : "string",
    "name": "string"
  },
  "original_request": {
    "version": "1.0",
    "session": {
      "new": true,
      "sessionId": "amzn1.echo-api.session.[unique-value-here]",
      "application": {
        "applicationId": "amzn1.ask.skill.[unique-value-here]"
      },
      "attributes": {
        "key": "string value"
      },
      "user": {
        "userId": "amzn1.ask.account.[unique-value-here]",
        "accessToken": "Atza | AAAAAAAA... ",
        "permissions": {
          "consentToken": "ZZZZZZZ... "
        }
      }
    },
    "context": {
      "System": {
        "device": {
          "deviceId": "string",
          "supportedInterfaces": {
            "AudioPlayer": {}
          }
```

FIG. 11A

```
    },
    "application": {
        "applicationId": "amzn1.ask.skill.[unique-value-here]"
    },
    "user": {
        "userId": "amzn1.ask.account.[unique-value-here]",
        "accessToken": "Atza | AAAAAAA... ",
        "permissions": {
            "consentToken": "ZZZZZZZ... "
        }
    },
    "apiEndpoint": "https://api.amazonalexa.com",
    "apiAccessToken": "AxThk... "
    },
    "AudioPlayer": {
        "playerActivity": "PLAYING",
        "token": "audioplayer-token",
        "offsetInMilliseconds": 0
    }
    },
    "request": {
        "type": "IntentRequest",
        "requestId": "string",
        "timestamp": "string",
        "dialogState": "string",
        "locale": "string",
        "intent": {
            "name": "GeneralQueryIntent",
            "confirmationStatus": "string",
            "slots": {
                "SlotName": {
                    "name": "Query",
                    "value": "How big is the united states?",
                    "confirmationStatus": "string",
                }
            }
        }
    }
}
```

FIG. 11B

```
"feature_server": {
  "url": "https://feature.url.com",
  "ip_address" : "100.0.0.0"
},
"response": {
  "text_content" : "The response as text to be read or displayed by the assistant",
  "media": {
    "audio_url" : "https://urlto.mp3",
    "video_url" : "https://urlto.mp4",
    "small_image_url": "https://urltosmall.png",
    "large_image_url": "https://urltolargeimage.png"
  }
}
```

FIG. 12

```
{
  "version": "string",
  "sessionAttributes": {
    "key": "value"
  },
  "response": {
    "outputSpeech": {
      "type": "PlainText",
      "text": "The Football game is at 3:00pm at the Stadium today"
    },
    "card": {
      "type": "Standard",
      "text": "The Football game is at 3:00pm at the Stadium today.",
      "image": {
        "smallImageUrl": "https://urltosmall.png",
        "largeImageUrl": "https://urltolargeimage.png"
      }
    },
    "shouldEndSession": true
  }
}
```

FIG. 13

Higher Ed Application - Quiz

+ Add a New Content Item

∧ Quiz Question 01 - Student Body Size    Collapse Details    Un-Publish

Prompt

Question Prompts Module Edit Title    Delete Module

FORMATS AVAILABLE:    View Compatible Devices    Add/Edit Media

⊙ Text    ⊙ Audio    ⊙ Image    ⊙ Video

+ Add a New Prompt Variation

Variation 01    Preview  Edit  Delete
How many students are enrolled at Boston University?

Variation 02    Preview  Edit  Delete
Including both undergraduate and graduate studies, how many students are enrolled at Boston University?

Variation 03    Preview  Edit  Delete
What is the total number of students at Boston University?

User Response

Failure Rate:  Alexa: 12%   Google Assistant: 8%   ⚠ Siri: 45%   Cortana: 18%

Acceptable Responses Module Edit Title    Delete Module

+ Add a New Response Variation

Variation 01    Edit  Delete
There are currently 32,551 students enrolled at Boston University Variation 02    Edit  Delete
There are 32,551 students total Variation 03    Edit  Delete
There are about 32,000 students enrolled this year > Quiz Question 02 - University Ranking    Expand Details    Publish > Quiz Question 03 - Founder    Expand Details    Publish > Quiz Question 04 - Campus History    Expand Details    Publish

FIG. 22

Content Item 01 - Student Body Size - Media Compatibility — 661

| | Text | Audio | Image | Video |
|---|---|---|---|---|
| | Enabled for this content | Enabled for this content | Enabled for this content | Not Enabled for this content |
| Alexa-Enabled Device — Amazon Alexa | ⊙ | ⊙ | ⊗ | ⊗ |
| Echo — Amazon Alexa | ⊙ | ⊙ | ⊗ | ⊗ |
| Echo Dot — Amazon Alexa | ⊙ | ⊙ | ⊗ | ⊗ |
| Echo Show — Amazon Alexa | ⊙ | ⊙ | ⊙ | ⊙ |
| Echo Spot — Amazon Alexa | ⊙ | ⊙ | ⊙ | ⊙ |
| Google Assistant Enabled Phone — Google Assistant | ⊙ | ⊙ | ⊗ | ⊗ |
| Google Home — Google Assistant | ⊙ | ⊙ | ⊗ | ⊗ |
| Google Home Mini — Google Assistant | ⊙ | ⊙ | ⊗ | ⊗ |

FIG. 26

Higher Ed Application - FAQ | + Add a New Content Item

∧ Content Item 01 - Student Body Size | Collapse Details | Publish

User Input | Delete Module

Inquiry Module Edit Title

+ Add a New Inquiry Variation

Variation 01 — Siri sometimes has difficulty with this word ✕
Suggested Alternatives:
"go to" — Replace — Add as Variation
"populate" — Replace — Add as Variation How many students inhabit our school? | Edit | Delete Variation 03
What is the size of the student body at Boston University? | Edit | Delete Variation 04
Tell me the number of students at Boston University? | Edit | Delete

631

Response

Response Module Edit Title | Delete Module

FORMATS AVAILABLE: | View Compatible Devices | Add/Edit Media
⊙ Text   ⊙ Audio   ⊙ Image   ⊙ Video ——632

+ Add a New Response Variation

Variation 01
There are currently 32,551 students enrolled at Boston University. | Preview | Edit | Delete Variation 02
There are currently 32,551 students enrolled at Boston University. 17,944 of which are undergrads | Preview | Edit | Delete Variation 03
There are typically about 32,000 students enrolled in a given year | Preview | Edit | Delete > Content Item 02 - Student Body Diversity | Expand Details > Content Item 03 - Campus Size | Expand Details > Content Item 04 - Campus Location | Expand Details

FIG. 33

VOICE APPLICATION PLATFORM

BACKGROUND

This description relates to voice application platforms.

Voice application platforms provide services to voice assistants and voice assistant devices to enable them to listen to and respond to end users' speech. The responses can be spoken or presented as text, images, audio, and video (items of content). In some cases the responses involve actions such as turning off an appliance.

Voice assistants, such as Apple's Siri, Amazon's Alexa, Microsoft's Cortana, and Google's Assistant, are accessed from servers by proprietary voice assistant devices such as Amazon Echo and Apple HomePod, or sometimes on generic workstations and mobile devices.

Voice assistant devices typically have microphones, speakers, processors, memory, communication facilities, and other hardware and software. A voice assistant device can detect and process human speech to derive information representing an end user's request, express that information as a request message (which is sometimes called an intent or contains an intent) in accordance with a predefined protocol, and communicate the request message through a communication network to a server.

At the server, a voice application receives and processes the request message and determines an appropriate response. The response is incorporated into a response message expressed in accordance with a predefined protocol. The response message is sent through the communication network to the voice assistant device. The voice assistant interprets the response message and speaks or presents (or takes actions specified by) the response. The work of the voice application is supported by an infrastructure of operating systems and other processes running on the server.

The services provided by the server to the client voice assistant devices to enable their interactions with end users are sometimes called voice assistant services (which are sometimes also called or include skills, actions, or voice applications).

Interaction between an end user and a voice assistant can include a series of requests and responses. In some cases, requests are questions posed by end users and the responses are answers to the questions.

Typically, the server, the voice assistant devices, the voice assistants, the voice assistant services, the predefined protocols, and basic voice applications are designed together as part of a proprietary voice assistant framework. To enable third parties—such as brands that want to engage with the end users through the voice assistants—to create their own voice applications, the frameworks provide proprietary APIs.

SUMMARY

In some implementations, the universal voice application platform that we describe here provides brands and organizations with the ability to create and maintain engaging voice applications in one location that services Amazon Alexa, Google Assistant, Apple HomePod, Microsoft Cortana, and other devices. The platform is designed to offer brands and organizations the ability to deploy a voice application quickly while offering flexibility via customization capabilities.

The platform provides features that handle voice requests and are bundled within modules. The features include handlers that process voice requests for events, FAQs, daily updates, reminders, checklists, surveys and latest news, and other pre-defined features. Module bundles reference features based on common use cases related to industry specific needs and contain sample content to enable speed-to-market for brands and organizations.

Brand authors can administer voice content within the platform's voice content management system. The voice content management system offers an intuitive interface that does not require technical knowledge to create, modify, and remove content that shapes the voice experience. The platform's content management system also provides guidance and insight to brand administrators via end-user usage analytics captured over time. Guidance includes clues such as visual indicators for supported devices by media type (e.g., video and image media supported by the Amazon Echo Show). Insights include analytics regarding the success rate of a response for a given question across device types (e.g., and insight that Google responds more to the same question than Amazon Alexa).

Behind the scenes, the platform is cloud-based, eliminating the need for brands and organizations to invest in additional infrastructure. The cloud-based offering also results in regular updates and enhancements that are automatically available to brands and organizations that are customers of the platform.

The platform uses a layered architecture that does not rely on dependencies from other layers in the system. The layers include a voice API layer, a business logic layer, a feature and module layer, a CMS layer, and a data layer.

Among the unique aspects of the platform are the following:

1. The platform processes data from multiple voice assistant frameworks (such as Alexa, Google Home, Apple HomePod, chatbots into a singular API/business logic layer. The platform abstracts the data and processes it to enhance the understanding of the end user's intent. The platform uses graph-based pattern matching as opposed to a rules-based engine. The graph-based pattern matching allows a consistent and confident approach to managing mapping cross-assistant intents with the feature of the platform to use. This makes the voice applications more manageable and updateable while still giving the flexibility to enable machine learning to update positions of nodes in the graph. The graph-based approach only requires one step to support a newly added voice assistant framework. A new node (datapoint) is added to a graph database to create a connection between voice intents from an end-user.

2. Since the platform has access to data from multiple voice assistant frameworks the platform can compare how certain frameworks perform relative to others. For example, the platform can see the failure rates of different voice applications and features across the various voice assistant frameworks and as a result can use machine learning and algorithms to understand an end user's intent better than the specific voice assistant framework that they are using. This is possible by detecting patterns of success and failure for each framework for the same type of content and determine what changes would make it more successful in turn allowing for finding the best superset of content variations to fit all supported frameworks.

3. Since the platform collects performance data across multiple devices through a single API it can collect and analyze performance and provide content recommendations effectively. The platform uses machine learning and its own algorithms to report back how one voice application is doing relative to another in order to make real-time dynamic content suggestions to voice application developers directly within the user interface of the platform. This can optimize the performance of a voice application and enhance the overall end user experience.

4. The platform supports sets of dynamic content offering more than one way to answer a question or give a response. This creates a more engaging voice experience since the prompts and responses can change from session to session. It also allows for the creation of personas and changing the voice experience depending on the preferences and demographics of the end user. By contrast, for example, if ten end users ask Alexa the same question, the voice assistant will interact in the same way all ten times. The platform described here allows the voice application developer to set up infinite different responses for each of the ten users and the responses can even be personalized to each specific individual. For example, if the platform determined that the end user is a 35-year-old female living in the Georgia, then the developer may decide that that end user may be more comfortable talking to another female who has a southern accent and who speaks using local colloquialisms and local references. The platform allows the developer to change the words that the specific voice platform uses when speaking to the end user. The developer also can use the platform to record amateur or professional voice talent with the relevant gender, accent, dialect, etc. The result is a more authentic/human interaction between the end user and their voice assistant device.

5. The platform natively supports multilingual content for prompts and responses. This is useful in order to reach a larger audience within the United States and worldwide. It also creates more inclusive and human experiences between end users and their voice assistant devices. Multilingual support is built into the interface for non-English speaking administrators along with the ability to add, modify and remove multilingual content.

6. The platform offers both speed to market via pre-defined modules with sample content and flexibility via customization. Platform lets a developer use the pre-defined modules and the platform's content management system or create a custom voice experience using a combination of their own modules and content that interfaces with the platform via API's. This is important because it will enable voice app creators/administrators to create and manage more customized and authentic voice experiences, which will ultimately benefit end users.

7. Using a human voice for prompts and responses as opposed to an AI computer voice leads to a more authentic and engaging experience. The platform allows administrators to create and edit audio and video content directly within the platform. There is no need to leave the platform to create new content. An administrators can create a voice interaction in a voice application, including the creation of rich media (audio and video) content all in one place. In typical known, an administrators is expected to create audio and video assets outside of the voice application platform. The platform enables administrators to add media directly within the platform and its user interface, thus increasing efficiency and speed to market. In addition, this ultimately leads to deeper, richer voice experiences for the end user.

8. Voice assistant devices vary in how they handle multimedia based on its internal hardware. One device may support video, audio, images and text while another may only support text and audio. The platform offers media guidance on whether a specific piece of content within the platform is supported by particular voice Assistant devices and frameworks, in real time directly in the user interface of the platform. This provides user with vital information on what content he or she should focus on while learning how to optimize the experience on a specific voice assistant device.

Therefore, in general, in an aspect, requests are received from voice assistant devices expressed in accordance with corresponding protocols of one or more voice assistant frameworks. Each of the requests represents a voiced input by a user to the corresponding voice assistant device. The received requests are re-expressed in accordance with a common request protocol. Based on the received requests, responses to the requests are expressed in accordance with a common response protocol. Each of the responses is re-expressed according to a protocol of the framework with respect to which the corresponding request was expressed. The responses are sent to the voice assistant devices for presentation to the users.

Implementations may include one or a combination of two or more of the following features. The requests are expressed in accordance with corresponding protocols of two or more voice assistant frameworks. The voice assistant frameworks include a framework of at least one of Amazon, Apple, Google, Microsoft, or a chatbot developer. The generating of the responses includes using information from the requests to traverse a graph. Traversing the graph includes identifying features to be used to implement the responses. The features are organized in modules. At least one of the modules is pre-defined. At least one of the modules is custom defined. At least one of the modules includes a collection of pre-defined features with pre-defined items of content tailored to a specific industry or organization. The features include information about items of content to be included in the responses. The features include information about dynamic items of content to be included in the responses. At least one of the items of content is pre-defined. At least one of the items of content is custom defined. The generation of the responses to the requests includes executing a voice application. The voice application includes a collection of functions that generate responses to human spoken requests. A generated response includes a verbal output. A generated response triggers other functions while providing the verbal output. The instructions are executable by the processor to: receive data about requests and corresponding responses for two or more of the frameworks, and analyze the received data to determine comparative performance of the responses for the frameworks. The performance includes performance of one or more of the voice assistant frameworks. The performance includes performance of one or more features used to implement the responses. The performance includes performance of one or more items of content included in the responses. The performance includes performance of one or more voice applications.

The instructions are executable by the processor to expose at a user interface of a voice application platform, features for selection and management of items of content to be included in the responses. In real time as the items of content are being selected or managed, information is exposed through the user interface about relative performances of respective items of content associated with characteristics of the items of content. Information is received through the user interface about selected or managed items of content. A voice application is executed to generate the responses including presentation of the selected and managed items of content. The user interface is configured to enable a non-technically trained person to select or manage the items of content and provide and receive information about the items of content. The instructions are executable by the processor to enable selection of items of content to be included in a given one of the responses, from alternative possible items of content. The selection of the items of content to be included in the given response are based on a context of a voiced input of an end user. The context of the voiced input of the end user includes a geographic location of the voice assistant device to which the response is to be sent. The context of the voiced input of the end user includes demographic characteristics of the end user.

The instructions are executable by the processor to present a user interface, configure the user interface to (a) enable creating voice applications for processing the requests and for generating the corresponding responses, (b) maintain modules of features to which the requests can be matched to generate the responses, including standard modules and custom modules, (c) include in each of the modules, a set of features that correspond to contexts in which the responses will be presented to the end users, and (d) expose the modules through the user interface.

The instructions are executable by the processor to expose at a user interface of a voice application platform features that enable selecting and managing items of content to be included in the responses. Each of the items of content requires the voice assistant devices to have corresponding content presentation capabilities. During the selecting and managing of the items of content, information is simultaneously exposed through the user interface about the capabilities of voice assistant devices that conform to respective different voice assistance frameworks to present the items of content being selected and managed. The voice application platform guides non-technically trained users about capabilities of the voice assistant frameworks and how they will represent images, audio, video, and other forms of media.

In general, in an aspect, requests are received through a communication network from voice assistant devices that conform to one or more different voice assistant frameworks. The requests are for service based on speech of end-users. The speech of the end users expresses intents. Data derived from the requests for service is used to traverse a graph of nodes and edges to reach features that match the respective requests for service. The features are executed to generate responses. The responses are sent through the communication network to the voice assistant devices to cause them to respond to the respective end users.

Implementations may include one or a combination of two or more of the following features. The voice assistant devices from which the requests are received conform to two or more different voice assistant frameworks. The data is derived from the requests for service by abstracting information in the requests to a data format that is common across the two or more different voice assistant frameworks. The nodes of the graph are updated using outputs of a machine learning algorithm. Information about the requests is used to identify an initial node of the graph at which to begin the traversal. A node is added automatically to the graph to serve as the initial node of the graph at which to begin the traversal with respect to requests that conform to an additional voice assistant framework.

In general, in an aspect, requests are received through a communication network from voice assistant devices that conform to one or more different voice assistant frameworks. The requests are for service based on speech of end-users. The speech of the end users expresses intents. Responses to the received requests are determined. The responses are configured to be sent through the communication network to the voice assistant devices to cause them to respond to the respective end users. Measures of the success of the determinations of the responses are evaluated. Based on the relative measures of success of the responses, a user can, through the user interface, manage subsequent responses to requests for service.

Implementations may include one or a combination of two or more of the following features. the Voice assistant devices from which the requests are received conform to two or more different voice assistant frameworks. Suggested responses are presented to the user through the user interface based on the evaluated measures of success, and the user can select responses to be sent to the voice assistant devices based on the suggested responses. The evaluation of measures of the success includes evaluating success of items of content carried by the responses across two or more of the different voice assistant frameworks. The evaluation of the measures of the success includes evaluating success of the responses relative to the respective voice assistant frameworks of the voice assistant devices to which the responses are to be sent. The evaluation of the measures of the success includes evaluating success of the responses relative to two or more different voice applications configured to receive the requests and determine the responses. The items of content to be carried in subsequent responses are managed based on the measures of success.

In general, in an aspect, features are exposed at a user interface of a voice application platform that enable selecting and managing items of content to be included in responses to be provided by a voice application to voice assistant devices that conform to one or more different voice assistant frameworks, In real time while the items of content are being selected and managed, information is exposed through the user interface about relative performances of respective items of content associated with characteristics of the items of content. Information is received through the user interface about selected and managed items of content. A voice application is executed to generate the responses to include the selected and managed items of content.

Implementations may include one or a combination of two or more of the following features. Usage data is aggregated from the voice assistant devices that conform to the two or more different voice assistant frameworks. Information is generated about the relative performances of respective items of content from the aggregated usage data. The usage data is aggregated through a universal API. The information about the relative performances is generated by a machine learning algorithm.

In general, in an aspect, requests for service are received through a communication network from voice assistant devices that conform to one or more different voice assistant frameworks. The requests for service are based on speech of end-users. The speech of the end users expresses intents. Responses to the received requests are determined. The responses are configured to be sent through the communication network to the voice assistant devices to cause them to respond to the respective end users. The responses include items of content. The items of content included in a given one of the responses are selected from alternative possible items of content. The selection of the items of content to be included in the given response are based on a context of the expressed intent of an end user.

Implementations may include one or a combination of two or more of the following features. The voice assistant devices from which the requests are received conform to two or more different voice assistant frameworks. One of the voice assistant frameworks includes a chatbot framework. The context of the expressed intent of the end user may include the geographic location of the voice assistant device to which the response is to be sent. The context of the expressed intent of the end user may include demographic characteristics of the end user. The demographic characteristics include linguistic characteristics inferred from a geographic location of the voice assistant device to which the responses are to be sent or inferred from characteristics of words contained in the received requests. The demographic characteristics may include age. The linguistic characteristics include local colloquialisms or local references. The demographic characteristics may include gender. The end user preferences based on which the items of content to be included in the given response can be selected.

In general, in an aspect, a user interface is presented for development of voice applications. The user interface is configured to enable creation of voice applications for processing requests received from voice assistant devices and for generating corresponding responses for the voice assistant devices to present to end users. Modules of features are maintained to which the requests can be matched to generate the responses. Each of the modules includes a set of features that correspond to contexts in which the responses will be presented to the end users. The maintaining of the modules includes (a) maintaining standard modules for corresponding contexts, and (b) enabling generation and maintenance of custom modules of features to which the requests can be matched to generate custom responses for the voice assistant devices. The modules are exposed through the user interface.

Implementations may include one or a combination of two or more of the following features. Items of content are maintained to be used with the features in generating the responses. The maintaining of the items of content includes (a) maintaining standard items of content, and (b) enabling generation and maintenance of custom items of content to be used with the features to generate custom responses for the voice assistant devices. The contexts relate to products or services in a defined market segment. The contexts relate to demographics of target groups of end users. The contexts relate to capabilities of the voice assistant devices. The contexts relate to types of content items to be used with the features in generating the responses.

In general, in an aspect, a user interface is presented for development of voice applications. The user interface is configured to enable creation of voice applications for processing requests received from voice assistant devices and for generating corresponding responses for the voice assistant devices to present to end users. Responses to the received requests are determined. The responses are configured to be sent through the communication network to the voice assistant devices to cause them to respond to the respective end users. The responses include items of content. The user interface enables creation and editing of items of the content in rich media formats for inclusion with the responses.

Implementations may include one or a combination of two or more of the following features. The rich media formats include image, audio and video formats. The user interface is presented by a platform that enables the creation of the voice applications. The platform enables recording and editing of the items of the content directly within the platform through the user interface area In general, in an aspect, exposing features at a user interface of a voice application platform. The features enable selecting and managing items of content to be included in responses to be provided by a voice application to voice assistant devices that conform to one or more different voice assistant frameworks. Each of the items of content requires the voice assistant devices to have corresponding content presentation capabilities. While the items of content are being selected and managed, information is simultaneously exposed through the user interface about the capabilities of voice assistant devices that conform to respective different voice assistance frameworks to present the items of content being selected and managed.

Implementations may include one or a combination of two or more of the following features. The voice assistant devices to which the responses are to be provided conform to two or more different voice assistant frameworks. The content presentation capabilities include capabilities of hardware and software of the voice assistant devices. The content presentation capabilities relate to types of content items. The types of content items include text, images, audio, and video.

In general, in an aspect, a user interface is presented for development of voice applications. The user interface is configured to enable creation of voice applications for processing requests received from voice assistant devices and for generating corresponding responses for the voice assistant devices to present to end users. Responses to the received requests are determined. The responses are configured to be sent through a communication network to the voice assistant devices to cause them to respond to the respective end users, the responses including items of content expressed in natural language. The user interface enables a user to select and manage the expression of one or more of the items of content in any one of two or more natural languages.

Implementations may include one or a combination of two or more of the following features. The user interface is presented in any one of two or more different natural languages. Each item of content is represented according to a data model. The representation of each of the items of content inherits an object that contains properties for the natural language of the item of content.

These and other aspects, features, and implementations can be expressed as methods, apparatus, systems, components, program products, methods of doing business, means or steps for performing a function, and in other ways.

These and other aspects, features, and implementations will become apparent from the following descriptions, including the claims.

DESCRIPTION

FIGS. 1, 2 through 10, 14 through 21, and 29 through 32 are a block diagrams.

FIGS. 11A, 11B, 12, and 13 are examples of code.

FIGS. 22 through 28 and 33 are user interface screens.

As shown in FIG. 1, here we describe a technology 10 that provides a universal voice application platform 12 (which we sometimes call simply a "platform" or a "universal platform" or a "cross-device platform"). The platform is configured for (among other activities) creating, storing, managing, hosting, and executing voice applications 14 and providing voice assistant services 11 to voice assistants 13 and voice assistance devices 18. The platform serves two classes of users.

One class comprises end users 28 of the voice assistant devices and voice assistants. The end users are served by universal voice applications that can process requests from voice assistant devices that conform to any framework and formulate corresponding universal responses that can be translated to responses useable in any framework.

The other class of users includes platform participant users 45 who use the platform in a software as a service mode, through user interfaces 39, to create, store, and manage the universal voice applications and related items of content, among other things. The platform is configured to enable the platform participant users to quickly create, store, and manage standardized universal voice applications based on predefined standard items of content and other components needed for the voice applications. In other modes of use, the platform is configured to enable the platform participant users to create, store, manage, and control customized universal voice applications and related items of content, among other things.

The standardized universal voice applications, items of content, and other components can be stored on the platform servers 22. The customized universal voice applications, items of content, and other components can be stored on customization servers.

At run time, spoken requests (e.g., intents) 26 from end users are received by voice assistant devices 18, which process them and formulate request messages 341. The request messages 341 are passed through a communication network 29 to voice assistant servers 31 operated, for example, by parties that control particular frameworks (such as Amazon with respect to the Alexa framework. The voice assistant servers process the incoming messages, parse them to derive request message elements and pass the processed request information to the platform servers.

The platform servers use the received message elements to determine the best response according to a given standardized or custom voice application being executed. For that purpose, the platform servers can refer to standard voice applications, items of content, and other components stored and managed on the platform servers, or can refer to the customization servers for customized voice applications, customized items of content, and other customized components. The platform servers formulate corresponding appropriate response message elements 35 and returns them to the voice assistant servers, which use them to generate formal voice response messages 32. The responses 34 can be spoken or presented in text, images, audio, or video. The platform stores items of content 52 in various media formats for use in the responses. In some cases the responses could involve response actions such as turning off an appliance.

The three sets of servers (platform servers, customization servers, and voice assistant servers) can be created, managed, operated, owned, or controlled (or combinations of those activities) respectively by three different parties: (a) a platform host that operates the platform as a business venture, (b) the platform participants who control their own customization servers, and (c) framework developers (such as Microsoft, Amazon, Google, Apple, and developers of chatbots) who operate their own voice assistant servers to control the manner in which request and response messages for their frameworks are handled. In some implementations, two or more of the three sets of servers could be controlled by a single party for its own benefit or for the benefit of itself and another party.

Because the platform is cloud-based (for example, is implemented using one or more servers that communicate through communication networks with client voice assistant devices), platform participants need not invest in additional infrastructure to be able to create, edit, manage, and own robust voice applications. The cloud-based approach also enables regular updates and enhancements to be added by the party that controls the universal voice application platform. The updates and enhancements become available automatically and immediately to platform participants.

Examples of the platform participants mentioned above include brands, advertisers, developers, and other entities that use the platform.

In some examples, people who use the platform as representatives of or on behalf of platform participants are sometimes called "platform participant users", "platform users" or "participant users." Participant users interact with the platform through one or more "participant user interfaces" 39 or simply "user interfaces."

As suggested earlier, some voice applications, which we sometimes call "standard voice applications" are designed, developed, and stored by the party that controls the platform and made available openly for use by platform participants. Some voice applications, which we call "custom voice applications" include custom items of content, custom features, or other custom components, and are designed, developed, stored, and controlled for particular purposes or by particular platform participants In some cases, these custom voice applications can be shared with other platform participants. In some instances, custom voice applications are proprietary to a single platform participant and are not shared.

We use the term "voice application" broadly to include for example, any application that can accept information about a request of a user of a voice assistant device and formulate elements of a response to the request to be returned to the voice assistant device where the response is to be implemented. A voice application can be created by any method that involves specifying how to accept and use the information about the incoming request and how to cause the elements of an appropriate response to be generated based on the information about the incoming request. The response can include items of content and the elements of the response can be generated by executing relevant defined functions based on the information about the incoming request. In typical known systems, a voice application is "hard wired" as code that accepts the request as input and executes pre-specified methods or functions based on the request to generate the response. Among the advantages of the platform and user interface that we describe here are that they provide participant users an easy-to-use, robust, effective, time-saving, highly flexible, cross-framework approach to developing, updating, controlling, maintaining, measuring the effectiveness of, and deploying voice applications and the items of content that they use. Fine-grained cross-framework, cross-content, and cross-feature analytics are made available to the users and also work in the background to improve the effectiveness of the voice applications. The resulting applications are in turn robust, adaptable, dynamic, and effective, among other benefits.

The platform 12 is configured to be able to accept request message elements that conform to any type of voice assistant framework, execute universal voice applications using those message elements, and return universally expressed response message elements that can be used to formulate response messages for any type of voice assistant framework, In other words, the universal voice application platform can communicate simultaneously with voice assistant devices that belong to (e.g., conform to) multiple different current and future voice assistant frameworks, using request messages and response messages for each of the voice assistant devices conforming to the native protocols of its framework. At the same time, the universal application platform enables platform participants to develop, maintain, and deploy robust universally applicable voice applications that can interpret requests and formulate responses for voice assistant devices belonging to various different frameworks without having to develop, maintain, and deploy multiple parallel functionally similar voice applications, one for each framework to be served.

Thus, among the benefits of some implementations of the platform, platform participants can formulate, maintain, and deploy engaging effective robust voice applications through a single, easy-to-use coherent participant user interface. The resulting voice applications can universally serve Amazon Alexa, Google Assistant, Apple HomePod, Microsoft Cortana, and any other kind of current or future voice assistants and voice assistant devices. The platform is designed to enable a platform participant to deploy a voice application quickly and easily while offering flexibility through customization capabilities.

Also among the features and advantages of the technology and the platform are the following:

Graph based. The platform can interact with, provided services for, and process data associated with any voice assistant frameworks including existing proprietary frameworks developed by Amazon, Google, Apple, Microsoft, and others and non-proprietary frameworks, through a single universal API and universal business logic layer. The platform abstracts received request messages and processes them to understand the end users' requests (e.g., intents) using graph-based pattern matching rather than a rules-based engine (although it may be possible to combine the graph-based pattern matching with a rules-based approach). The graph-based pattern matching enables a consistent and confident approach to mapping request messages, across multiple voice assistant frameworks, to features to be used in formulated responses. The graph-based approach is manageable, updateable, and flexible enough to enable machine learning to update positions of nodes in the graph. New voice assistant frameworks can be accommodated by the graph-based approach simply by adding a new node (data point) to the graph database to create a connection reachable based on request messages received from voice assistant devices that conform to the new voice assistant framework.

Cross-framework analysis. Because the universal voice application platform has access to usage data from multiple different voice assistant frameworks, the platform can compare how frameworks perform relative to one another. For example, the platform can analyze failure rates of different voice applications in processing and responding to received request messages and failure rates of particular features or items of content across multiple voice assistant frameworks. As a result, the platform can use machine learning and platform algorithms to understand an end user's request (intent) better than the request might be understood by the specific voice assistant framework being used, which has access only to usage data for that framework. This advantage is achieved, for example, by detecting patterns of success and failure for each framework for a given type of feature or content item and determining changes that would make the content item or feature more successful. This analysis enables the platform to identify the best superset of content item and feature variations across supported frameworks.

Robust content suggestions. Because the platform collects usage data across multiple voice assistant devices and multiple frameworks through a single API and can analyze their relative performances, the platform can provide effective feature and content recommendations to platform participants. The platform uses machine learning and algorithms to report to platform participants on the relative performances of different voice applications (including different voice applications of a given platform participant or different voice applications of different platform participants) in order to make real-time dynamic content suggestions to platform users directly within the platform user interfaces. These suggestions can help the platform users to optimize the performance of their voice applications and enhance the overall end-user experience.

Dynamic content. The platform supports sets of items of dynamic content, to provide, for example, more than one possible response to a request, such as alternative answers to a question. Dynamic content can enable a more engaging end-user experience because, for example, the responses can change from session to session. Dynamic content also enables one or more personas of voice assistants to be created and end-user experiences to be altered depending on preferences and demographics of the end users. In typical existing platforms, if ten end users ask a given voice assistant the same question, the voice assistant will interact in the same way all ten times. The universal voice application platform enables formulating a potentially infinite variety of responses for each of the ten end users and personalizing each response to the specific end user. For example, if the platform determined that the end user is a 35-year-old female living in Georgia, then a particular response can be chosen based on a decision by the developer that such an end user may be more comfortable talking to another female (the voice assistant) who has a southern accent and who speaks using local colloquialisms and local references. The platform enables the developer to change the words that a given voice assistant framework uses when speaking to an end user and to record amateur or professional voice talent having relevant gender, accent, dialect, or other voice characteristics. The result is a more authentic and acceptable interaction between a given end user and a voice assistant.

Typically, the platform cannot "hear" the end-user's accent because the request message does not carry an audio file from any of the voice assistant frameworks. The platform only receive text and can look for key words that give clues that the end user may have an accent. An example would be "y'all" in the text which could be attributable to a southern United States accent. The platform also can couple identification of keywords with geographic information if available. The key word "y'all" received from voice assistant device in Atlanta Ga. could imply a southern accent.

Multilingual content. The platform natively supports multilingual content for responses enabling a platform participant to reach a larger audience within the US and worldwide. The platform also enables more inclusive and human experiences between end users and voice assistants. Multilingual support is built into the interface for non-English speaking participant users along with the ability to add, modify, and remove multilingual content.

Pre-stored and custom modules and content. The platform offers both (a) speed to market for brand owners or other platform participants using predefined (e.g., standard) features, modules of features, and sample content items, and (b) flexibility using customization or creation of custom of features, modules, and content items, among other things. The platform participant can use the standard features, modules, and content items 23 through an easy-to-use content management system to speed development or can create custom end-user experiences by creating their own custom features, modules, and content items, among other things, that operate with the platform using APIs. This arrangement enables platform participants to create and manage customized and authentic end-user experiences to serve end users better.

Human voice. Using a human voice for responses and not solely a synthesized computer voice yields a more authentic and engaging end-user experience. The platform enables participant users to create and edit audio and video content items directly within the platform through the user interface, without needing to resort to other off-platform content creation applications (although off-platform content creation applications could also be used). A platform participant can create a voice application that takes advantage of and includes rich media (audio and video) content items through a single participant user interface. Among the advantages of this arrangement are greater efficiency and speed to market and deeper, richer end-user experiences.

Media guidance on capabilities of devices. Voice assistant frameworks (and voice assistant devices that conform to them) vary in how they handle various types of content items based on their internal hardware and software. For example, one framework may support video, audio, images, and text while another may only support text and audio. The universal voice application platform offers media guidance on whether a specific type of content item is supported by specific voice assistant devices or voice assistant frameworks and provides the guidance in real time directly in the participant user interface of the platform. This guidance enables brands or other platform participants to determine which content to emphasize while learning how to optimize the end-user experience on a specific voice assistant device or voice assistant framework.

As explained earlier, in some implementations of the technology that we describe here, the voice assistant devices 18 process speech 26 of end users 28, interpret the speech as corresponding requests 48, incorporate the requests (e.g., intents) in request messages expressed according to the protocols of the voice assistant frameworks to which the voice assistant devices belong, and forward the request messages through the communication network or networks to the server, which processes the received request messages. As also shown in FIG. 1, the server formulates responses using relevant features 43 of voice applications 14, and (in most cases) sends corresponding response messages back to the voice assistant devices. The universal voice application platform includes modules 46 that organize and provide features 43 to enable the voice applications to handle the requests. In some implementations of the platform, such features of the modules are implemented as request handlers 41 that process a potentially wide variety of different types of requests (e.g., intents) for the voice applications, for example, requests associated with features such as events, FAQs, daily updates, reminders, checklists, surveys and latest news.

The features that are implemented as request handlers in a given module can represent a bundle of features that all are useful with respect to a common use case related, for example, to a set of platform participants that share common characteristics, such as entities that belong to an industry or market. Each module can also contain or be associated with pre-stored items of sample content 23 that can be invoked by and used by the request handlers in formulating responses to requests. The availability of pre-stored items of sample content can improve the speed-to-market for platform participants.

Participant users (for example, people who are working on behalf of particular companies, brands, organizations, or other platform participants) can create, edit, and manage customized items of content 22 through the platform's user interface using the platform's content management system 54. The content management system offers an intuitive user interface that does not require technical knowledge to create, modify, and remove items of content that shape end-user experiences.

The platform's content management system also provides guidance and insight to participant users by collecting usage data and applying analytics 56 to the collected usage data 55. In the user interface, guidance can be provided by clues such as visual indicators for voice assistant devices by media format of the content items 653 supported by particular frameworks (e.g., video and image media supported by the Amazon Echo Show). Insights include, for example, analytics regarding the success rate of a response formulated by a voice application for a given request across voice assistant devices of different frameworks (e.g., Google Assistant successfully responds more to a given request than does Amazon Alexa).

Figure 2:
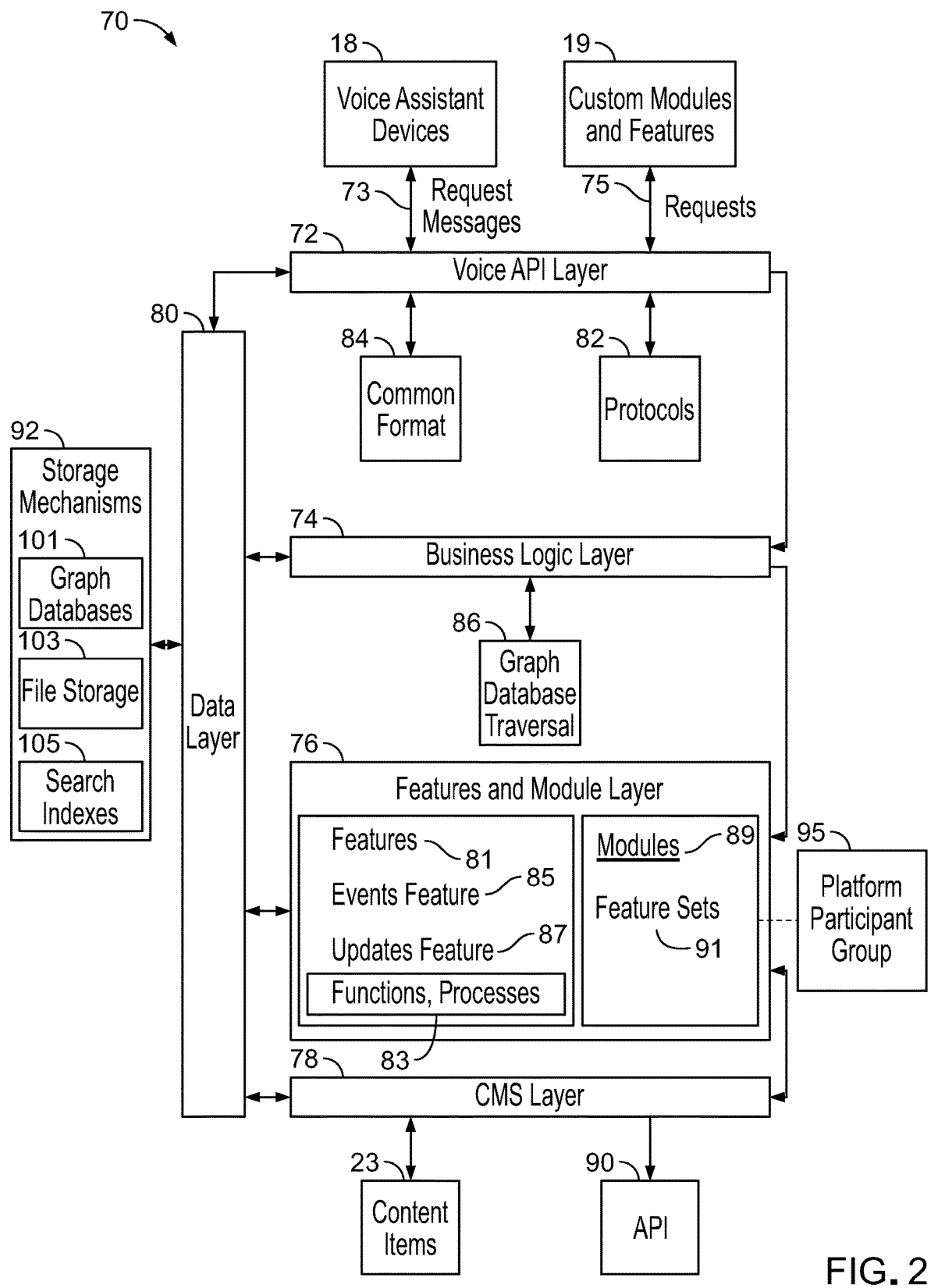

As shown in FIG. 2, the universal voice application platform 12 uses an architecture 70 of independent functional layers. The layers include: an API layer 72, a business logic layer 74, a features and modules layer 76, a CMS (content management system) layer 78, and a data layer 80.

API Layer

The API layer handles request messages 73 received from voice assistant devices and requests 75 received from custom modules and features. The API layer accepts request messages and other requests expressed in accordance with protocols 82 associated with any possible proprietary or non-proprietary voice assistant framework. When the API layer receives a request message or other request that conforms to any of the defined protocols, the API layer abstracts (e.g., translates, transforms, or maps) the received request message or request into a request expressed in accordance with a common universal protocol 84 for further processing. This abstraction enables supporting a wide variety of proprietary and non-proprietary voice assistant frameworks, voice assistant devices, and voice assistants using universal business logic and other logic layers (such as the features and modules layer and the CMS layer) instead of requiring a separate stack of logic layers for each voice assistant framework.

As an example, Amazon Alexa and Google Assistant each provide request messages expressed in JSON to the API layer of the platform for processing. The protocol for expressing the request message is generally the same regardless of the frameworks to which the voice assistant devices conform but the object and value pairs contained in the request message differ between the two different frameworks, supported respectively by Google or Amazon. For example, both platforms represent a user and whether or not a session is new within JSON protocol; The specific key and value pairs for Google Assistant are "userid|Unique Number" and "type|New" whereas the specific keys for Alexa are "userid|GUID" and "new|True". The platform detects which framework is associated with a particular voice assistant device sending the request message to determine how the request message should be processed further. The platform reconciles the differences and normalizes the information into a common format for additional processing.

Business Logic Layer

The business logic layer applies business logic to handle key operations for the platform related to mapping message elements of each of the incoming requests to a specific appropriate module and features that can and will handle the request. In some implementations, the business logic layer performs the mapping by graph traversal using a graph database 86 stored as one of the databases in the server. In some cases, the graph traversal determines which module and feature most likely matches (e.g., is most likely to process and formulate a response properly to) a given request. The graph database contains data representing a graph of nodes connected by edges. The graph traversal is a search technique that looks for patterns within the graph database based on item relationships. A pattern represents edges within the graph that connect one or more nodes. For example, a request message from an Amazon Alexa device with the literal phrase "stop" as one of the message elements will map to the "stop" feature node of the graph based on edge values of Alexa and the stop directive. Based on the results of the graph traversal, the business logic layer processes the requests that have been expressed in an abstract universal protocol to identify the most likely matching module and feature of the features and modules layer 76 of the universal voice application platform.

Features and Modules Layer

The features 81 within the features and modules layer represent functions or processes 83 that are invoked as a result of processing a request in the voice API layer and the business logic layer. For example, a function to return a list of events expects message elements parsed from a request message and received from the business logic layer to represent a date of an event or a type of event such as basketball games or both. Features within the platform are segmented according to types of requests to be processed. for example, all requests for information about events can be handled by a function of an events feature 85 while all requests for the latest general update is handled by a function of a daily updates feature 87. Feature segmentation by type of request provides a structured format for processing requests and housing responses. The functions of each feature and items of content that are used by them can be stored and managed by the party that controls the platform or participant users or both. Because features and modules closely relate to and use items of content, the features and modules layer is one of two layers (the other being the CMS layer) that participant users can view and work with directly by name in the user interface of the platform.

Modules 89 provide a structure for referring to or bundling sets 91 of features 81 that are commonly used by or relevant to a group of platform participants, for example, companies belonging to a given industry 95, or sets of features that are relevant to given use cases. More than one module can refer to or include in its bundle a given feature. Because features refer to and use items of content, a reference to a module and a feature of the module amounts to a reference to particular items of content (e.g., pre-stored sample or standard items of content 23 hosted by the platform for use by platform participants). For example, a module for the higher education field and a module for the wellness industry may both contain references to (e.g., bundle) the same events feature the five but the use of the feature will be different based on items of content (e.g., items of sample or standard content or customized items of content) loaded when that feature is invoked respectively by the two different references in the two different modules. The higher education events module may formulate responses related to specific sports teams or school departments; the wellness events module may formulate responses for activities by city or office.

As discussed later, the universal voice application platform includes a search engine that retrieves specific items of content when a feature is invoked, by performing a content search against a search index. For example, an inbound request message that states "what's happening next Tuesday on campus?" is handled by the events feature searching against the index to return a list of events that are in the database having the value of the date of that Tuesday.

CMS Layer

The standard and custom items of content 23 are created, stored, and managed by participant users through a main part of the platform user interface that exposes features and functions of the CMS layer 78. The CMS layer also enables participant users to control management and access rights. The CMS layer is designed to be easy enough for non-technical administrators to use. The CMS layer supports a variety of formats of items of content including: audio as .mp3, video as .mp4, images as .png, raw text, and text as SSML (Speech Synthesis Markup Language), among others. For interoperability, the CMS layer offers its own API 90 to support requests from external applications in addition to supporting requests from the features and modules layer 76. For example, a platform participant may re-purpose items of content stored within the CMS layer for external voice apps and for other distribution channels such as for presentation through mobile apps. In the latter case, the mobile app can retrieve items of content stored within the CMS layer through use of the API.

Data Layer

The data layer is the repository of data used by all layers, user interfaces, and other functions of the platform. The data layer employs a variety of storage mechanisms 92 such as graph databases 101, file storage 103, search indexes 105, and relational and non-relational database storage. The data layer houses data for at least the following users, mechanisms, and uses: participant users, system permissions, mappings for modules and features, items of content related to features and responses formulated by features, and usage data for analytics, among others.

Significant Aspects of the Technology and the Platform

Among significant aspects of the technology and the platform, including its layers and the user interface, are the following, some of which have been mentioned earlier.

Support for a Variety of Voice Assistant Devices Using an API Layer

The API layer can process request messages from any type of voice assistant device, including any voice assistant device that belongs to or complies with one or more voice assistant frameworks, such as those offered by, for example, Amazon, Google, Microsoft, and Apple, and others. New or customized voice assistant devices, voice assistants, and voice assistant frameworks developed in the future can be accommodated in a consistent way. Thus, by using a single API Layer, a variety of types (frameworks) of voice assistant devices can be accommodated without requiring development of entire distinct codebase sets for respective frameworks.

Graph Database Technology to Map Sentence Structure to Features

Request messages received at the platform (e.g., at the API layer) carry information about speech of users of voice assistant devices that is typically expressed as parts of loosely structured sentence patterns. An important function of the platform (and in some implementations, of the business logic layer of the platform) is to determine the correct or most suitable or relevant or effective features (we sometimes call them "appropriate features") that should be invoked for message elements contained in a given request message, based on the information carried in the loosely structured sentence patterns. Although graph database technology is typically used to identify pattern matches for entity relationships on large data sets of highly relational data, the platform here uses graph database technology to identify pattern matches for loosely structured sentence patterns against defined functions. For example, graph databases are often used to determine relationship patterns within large data sets for social networks. An individual represented by a node may have several relationships to other individuals and shared interests represented within the graph. The platform here leverages a graph database to match patterns on user request types to features within the platform. The graph enables working with a manageable data set.

Analytics Across Voice Assistant Frameworks

The platform can capture usage data within a single repository (e.g., databases within the data layer) for voice applications used across a variety of voice assistant devices, voice assistants, and frameworks. Using the stored usage data, the platform can perform analytics and supply the results to participant users and platform participants, for example, about the overall performance of a voice application across multiple types of devices or multiple frameworks and about the performance of individual request and response interactions for a particular voice application. At the voice application level, the platform can perform and accumulate, store, and provide the results of the analytics covering metrics that include: number of voice application downloads, number of voice application sessions, number of unique application sessions, length of average application session, the most frequent requests received, the average rate of successfully mapping requests to features, and failures to successfully map requests to features.

The usage data for each analytics metric can be segmented by the type of voice assistant, voice assistant device, or voice assistant framework, the date range, or a variety of other parameters.

API Layer and SDKs

As explained earlier and as shown in FIG. 3, voice assistant devices 98 express the requests spoken 99 by end users as structured data (request messages) in accordance with native protocols of the voice assistant devices. The native protocols may be determined by the frameworks with which the devices are associated. In some cases, the request messages are expressed in accordance with generic protocols that apply to types of voice assistant devices or frameworks that are not supported by the platform.

In order for the API layer (identified as the voice experience API 110 in FIG. 3) to be able to process request messages 73 that are expressed according to a particular protocol, the platform supports a set of SDKs 112 for different programming languages, voice assistant devices, and voice assistant frameworks.

The SDKs enable all types of voice assistant devices (conforming to any framework) to access the API layer with ease. The SDKs provide the developer or other platform participants with the expected format (protocol) for expressing communications with the platform. The SDKs include tools that enable a developer to define the characteristics of protocols for: authorizing and authenticating the voice assistant devices to permit them to access the API layer in a manner to apply the request messages in the expected format, authorizing a voice application registered with the platform, formatting raw request messages as data structures that conform to the applicable protocol for presentation to the API layer, formatting responses received from the API as proper data structures (response messages) according to the applicable protocol expected by the target voice assistant device, assuring that request messages are applied to the correct version of the API after updates roll out, and supporting multiple programming languages.

The platform SDKs can support common programming languages used to create skills, actions, extensions, and voice applications for various types of voice assistant devices and frameworks such as: JavaScript and TypeScript, C#, Java and Kotlin, Swift, and Go, among others.

For types of voice assistant devices (frameworks) for which processes are not normally written in one of the supported programming languages of the SDKs, the API layer can be accessed directly to enable developers to develop other SDKs or to present request messages directly to the API layer. The SDKs can be open sourced to help support members of the development community using programming languages outside the supported SDKs by demonstrating the design patterns and code architecture that fulfill requirements of native protocols of various frameworks and requirements of the API layer.

Once an SDK forwards a request message from a voice assistant device to the API layer, the API layer will map the message to the internal universal protocol of the platform. The API layer also will express a response 113 formulated by the feature servers 115 as a response message 117 that conforms to a protocol accepted by the voice assistant device that sent the request. The SDK can then accept the formatted response message from the API layer, validate the response message, and forward it through the network to the voice assistant device. The voice assistant device then renders or presents the response 119 (e.g., items of content carried in the response) to the end user. The presentation of the response could be by a reading of text contained in the response by the native AI voice of the voice assistant device, by directly playing an audio file, by presenting a video file, among others, or a combination of them, if the voice assistant device supports those richer formats.

For example, a request message processed by an SDK for Amazon Alexa is sent to the API layer for further processing. The API layer then maps the processed request to a normalized format (e.g., the common format). The normalized formatted request is then processed further using mappings to a specific feature as explained further later. The response returned from a feature is then formatted as a response message in the proper framework format and sent back to the SDK for Amazon Alexa for presentation as spoken text, audio, images, or video.

The availability of the SDKs does not, however, restrict the developer or other platform participant to use only features offered by the platform to develop voice applications. If, for instance, the developer wants to provide response behavior that cannot be implemented by any of the available features, the developer can skip using the SDKs to send incoming requests to the API layer and simply use the SDKs to implement explicit responses to requests. This capability enables developers to migrate to the platform by using existing skills and voice application experience without having to start from scratch.

For types of voice assistant devices or frameworks that are not supported by the platform, such as third party chatbots, non-mainstream voice assistants, and others, the developer can register the unsupported type of voice assistant device or framework in the platform's CMS layer. Doing this will generate a unique identifier of the voice assistant device or framework to enable better analytics tracking of types of requests from particular types of voice assistant devices or frameworks that are working better than others or to get usage data for a given type of voice assistant device or framework versus others.

Business Logic Layer Graph Traversal

Figure 3:
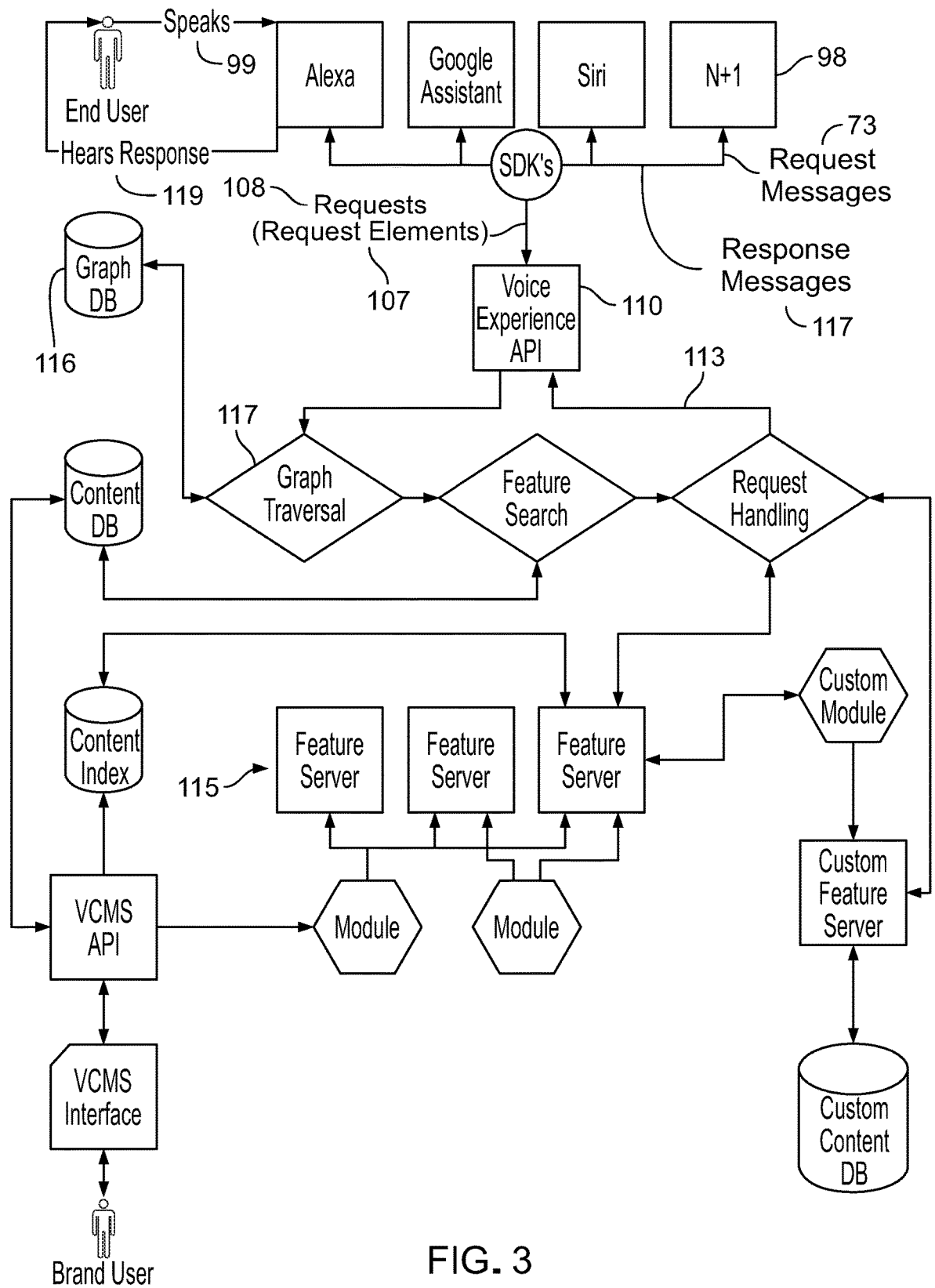

In order to support different voice assistant devices, the business logic layer handles patterns of request message elements included in request messages provided by each kind of voice assistant device or framework. As shown in FIG. 3, to be able to handle request elements 107 of request messages 108 from various types of voice assistant devices (voice assistant frameworks) 98 and map the patterns of the request elements back to the appropriate features 115, the business logic layer uses traversal 117 of a graph database 116 of relations between the patterns of request elements and features supported by the platform. The graph contains nodes for the request messages corresponding to each voice assistant device or framework and information about each feature supported by the platform. The graph database can be searched starting at any node to find a match of the request elements to the appropriate feature to use.

The traversal 117 of a graph database to match a request message and its request elements to the appropriate feature includes at least the following steps: API consumption, node endpoint search, graph traversal 117, and output processing.

API Consumption

A preliminary step in finding an appropriate feature to apply in formulating a response to a given request message is to create a RESTful API 110 for the business logic layer having unique endpoints to consume request message elements of native request messages from voice assistant devices associated with particular frameworks. Each unique endpoint in the RESTful API is aware of the protocol of the request elements included in message requests received from voice assistant devices that conform to a particular framework. For example, an endpoint may exist to consume the request elements included in request messages received from the Amazon Alexa SDK 112. A separate set of endpoints of the API consumes the types of request elements that the Google assistant SDK 112 sends with in its request messages. RESTful (Representational State Transfer) is a technical architecture style that leverages an API for communication between systems based on the Hyper Text Transfer protocol (HTTP).

These endpoints of the RESTful API enable tracking the request elements that conform to the protocols for each framework of voice assistant devices, and offers a generic set of endpoints for a generic set of request elements so that unregistered types (unsupported frameworks) of voice assistant devices or other applications also may interact with the features supported by the platform.

By having a set of understood protocols that are associated with respective different voice assistant frameworks and corresponding voice assistant devices, as well as a generic set of protocols, the system can search for an appropriate set of nodes in the graph database for matching to find an appropriate feature to formulate the response to the received request.

Node Endpoint Search

Typically request elements of request messages from voice assistant devices of a given framework can be broken down into relationships of a general type of request to internal request elements known as slots. (A slot is an optional placeholder for values that are passed by an end user in the form of a request. An example of a slot and a slot value is US_City and Seattle. US_City is the slot and Seattle is the value.) Based on that kind of structure, a graph database of the relationships of the request elements to features can be built. The relationships captured by such a graph database can include common types of relationships.

Figure 4:
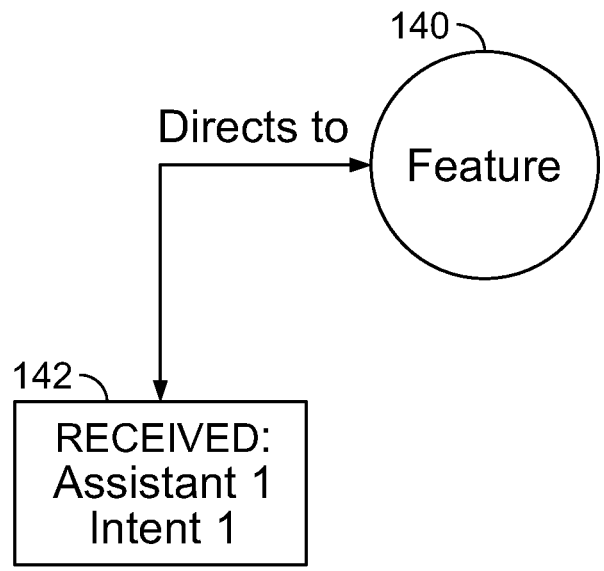
Figure 5:
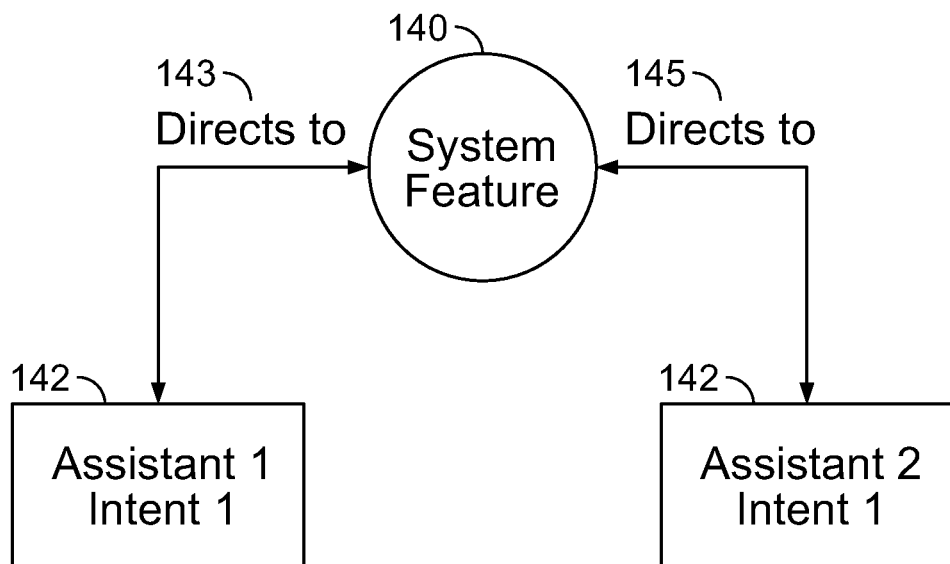

As shown in FIG. 4, a relationship between message elements (which in some contexts we refer to as intents) and a feature can be as simple as a type of message element 142 (intent 1) received from a type of voice assistant (assistant 1) relating to a particular feature 140 or (FIG. 5) can be more complex, for example, message elements 142 from two different assistants (assistant 1 and assistant 2) of different types (i.e., frameworks) of voice assistant device relating to the same feature 140. Example types of message elements could be an Alexa event search, which would share an edge 143 to the events feature node 140 in the graph and an Alexa event location search which would also share an edge 145 to the events feature node 140. The edge descriptor of an edge for a given message element to a given feature is "directs to"; the message element is the parent node that is directed to the child feature node.

Figure 6:
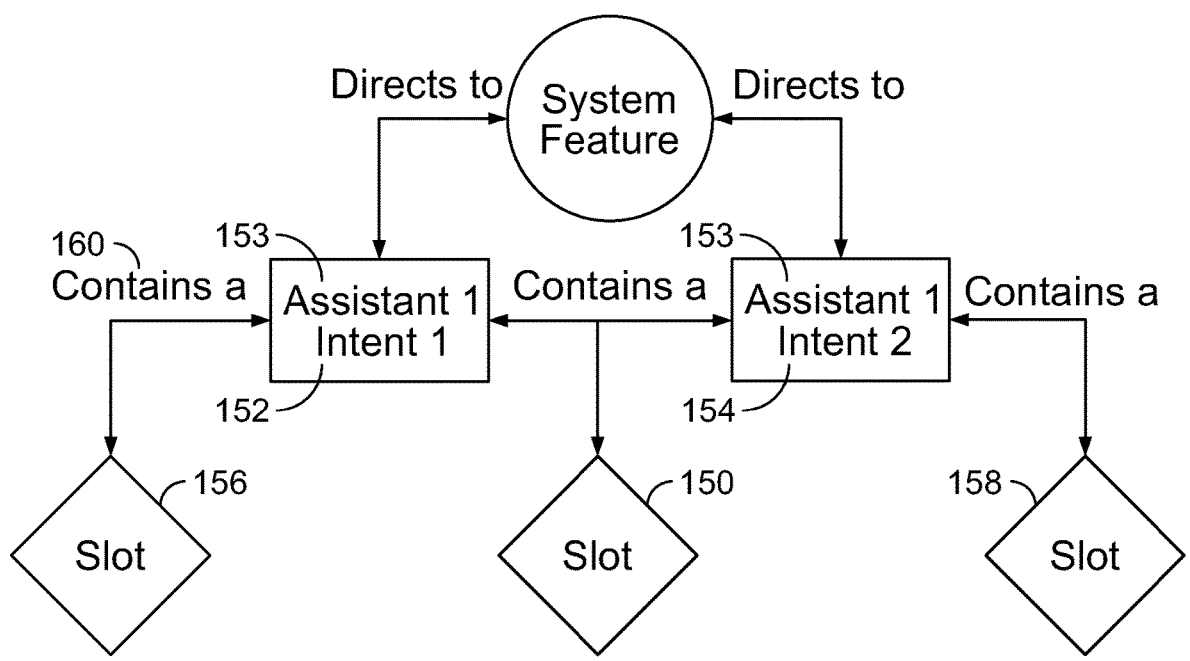

As shown in FIG. 6, a relationship can be more complex if a type of slot 150 can be shared by two different message elements 152, 154 originated by a particular type 153 of voice assistant device and if each of the two message elements also has its own slot type 156, 158 not shared with the other voice assistant device. Continuing the example of the message elements of Alexa event search and Alexa event location search relating to the events feature, these two different message elements 152, 154 will have inner (i.e., shared) slots. Some of the slots 150 may be shared between the two different message elements while some slots 156, 158 may not. Take, for example, a date type of slot and a location name type of slot. The message element type Alexa event search will contain both date and location name slot types, while Alexa event location search will only contain the location name slot type. The edge descriptor 160 for a message element to a slot is "contains," because the message element contains a slot or multiple slots.

Figure 7:
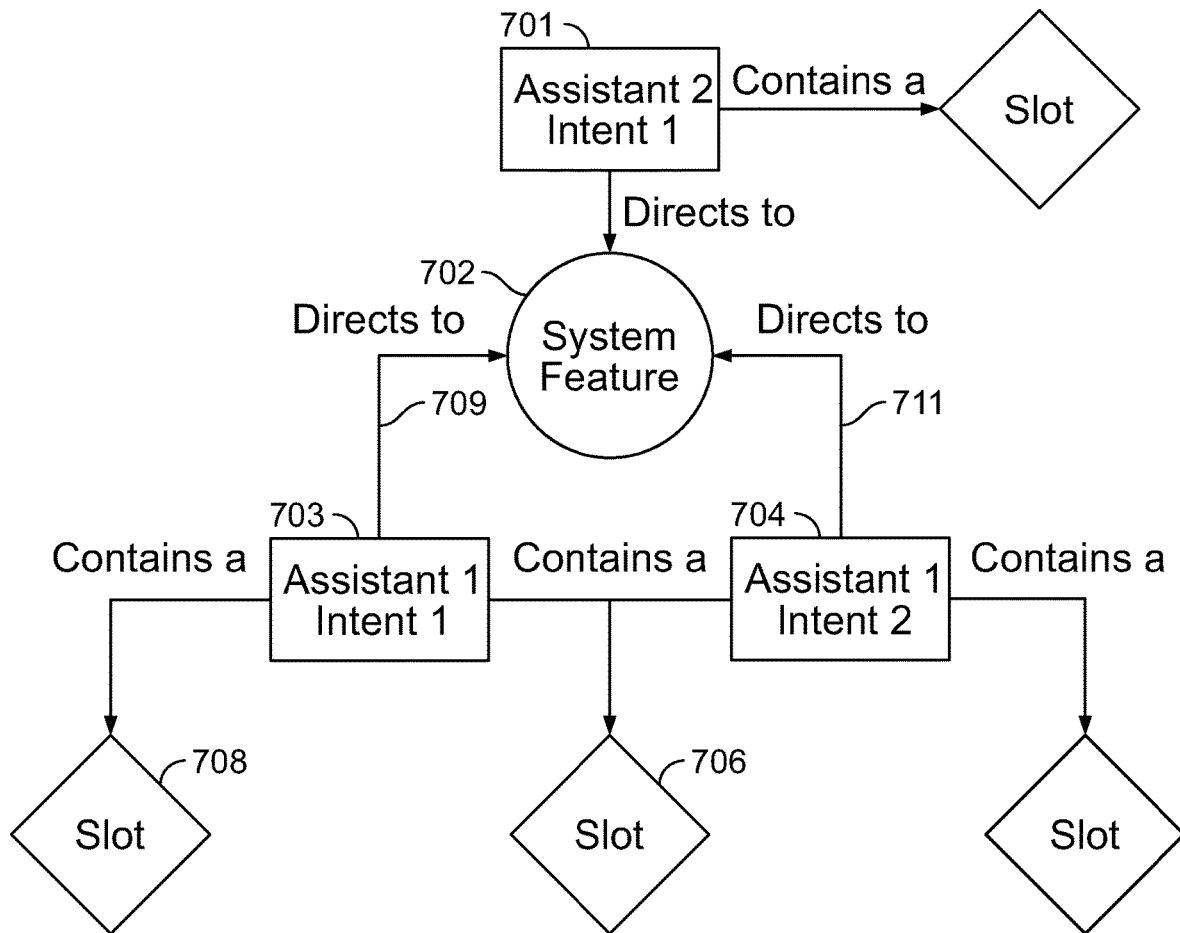

As shown in FIG. 7, in a more complex example, a feature 702 can also relate to multiple types of message elements from different types of voice assistant devices and their contained slots. In the example of the Alexa event search type of message element (intent 1) being related to the event feature 702, a voice assistant device other than Alexa (assistant 1), such as Google assistant (assistant 2), could have a framework that supports its own similar message element called Google events 701 (intent 1). Then the Google events node 701 in the graph would share a direct edge 711 to the same events feature 702 to which the Alexa event search 703 and the Alexa event location 704 search also share edges.

A node for a given message element can have edges that direct to multiple different features. For this to work, however, there must be a way to determine to which of the different features a given actual message element directs. The determination can be made, for example, if there are at two different slot types for the two different features that each relate only to one of the two features.

As shown in FIG. 7, if a first message element 703 relates to a feature 702 and has a slot type 706 shared with a second message element 704 that also relates to the same feature 702 and if the first message element has another slot type 708 that is not shared with the second message element, then the relationship 709 between the first message element 703 and the feature 702 that shares another message element 704 having the same slot 706 is stronger than is the relationship 711 between the second message element 704 and the feature 702. More detail on how this decision is made is discussed below with respect to graph traversal.

Consider, for example, two platform-supported features: an events feature and a daily messages feature. These two features formulate response messages that include different types of content items. One type of content item (for events) can be event information including dates, times, location, event type, and description. The other type of content item (for daily messages) could be audio or video messages to be broadcast to a group of people according to a schedule. There are many different types of request message elements that could relate to, that is, share a direct-to edge with the nodes representing these two features of the graph. There also are message elements that could direct to either feature but not both. Both features can be active in a voice application at a given time, so the only way to know which feature to direct to from a request message element is to look at the slots that the message element shares with each of the two features. For example, the Alexa what's new message element can direct either to the events feature or to the daily messages feature. However, the Alexa what's new message element can contain multiple slot types such as date and person name slots. The date slot also shares an edge with both features, but the person name slot only relates to the daily messages feature. Therefore, if a message element in a received request message is the Alexa what's new message element and the request message contains the person name slot, then the relationship between this request message and the daily messages feature is stronger than its relationship with the events feature. On the other hand, if there are more slot relationships between a feature node and one intent node than there are to another intent node and a request comes to the graph without the slots related to the one intent node filled, then the other relationship of the feature node to the other intent node is stronger. Within the same example, if a received request contained the Alexa what's new intent and only had the date slot filled, then the intent would be directed to the events feature.

Using these types of relationships, the graph database can include any simple or complex combination of nodes, edges, features, and slots. Once a request message is received through the API layer, the processing will begin at the node in the graph that matches the type of the message elements and will use the slot types included in the message elements to determine the best path to the most applicable feature.

Graph Traversal

Figure 8:
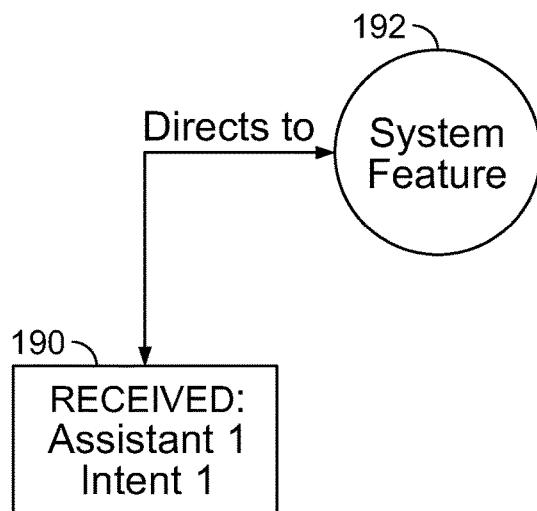

To find the most appropriate feature matching a message element, the traversal begins at the node and included slot nodes found in the endpoint search step. The logic of the business logic layer uses a graph to find all features immediately connected by edges to that node. As shown in FIG. 8, in the case of a simple relationship between a message element (intent 1) and a feature, the path traversed is one jump 190 along a single edge to a single feature 192, which is then selected to formulate the response message elements.

For a more complicated graph relationship where the message element has multiple related features, the search process must consider the slots related to the message element. If the message element includes only a slot related to a given feature type, then the traversal path will continue to the strongest relationship that includes the most slot relationships. In the example above of the events and daily messages features that share Alexa what's new message element, if the request message contains this message element as well as the date slot and person name slot, then the traversal path would lead to the daily messages feature which is the only feature node sharing an edge with the person name and date slots while the events feature only shares an edge with the date slot.

Message elements may relate to other message elements, even if the related message elements contain data for types of message elements of different types of voice assistant devices. Tying these relationships together can produce a stronger path to a selected feature. The traversal logic's goal is to determine a shortest path to the feature. If two features are the same number of edges away from (i.e., have the same path length to) the message element node, then the traversed path must lead to the feature with the strongest relationship, that is, known as the feature with the most connected short edges. For example, the Alexa event search message element could, instead of directing to the events feature, share an edge with the Google events message element. The Google Events message element could then have a direct-to edge to the events feature. The edge descriptor for the relationship between the Alexa Event Search message element and the Google Events message element would be called "relates to." Then the traversal path from the Alexa event search to the events feature be: Alexa event search relates to Google Events which directs to events.

Complex Graph Traversal

Figure 9:
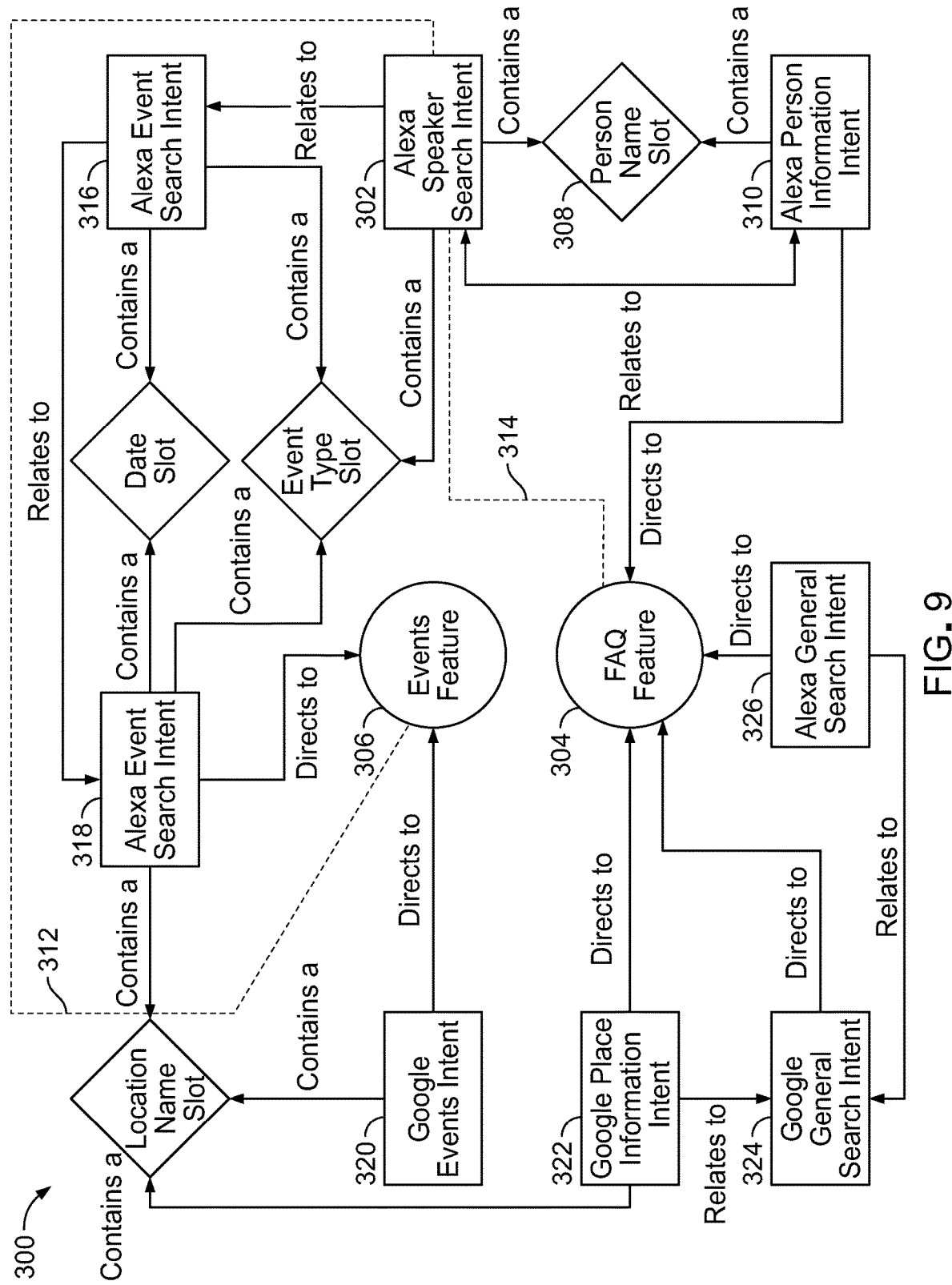

As shown in FIG. 9, a more complex example graph 300 includes multiple message elements carried in request messages from multiple types of voice assistant devices (corresponding to various frameworks) and multiple features. A few of the message elements can each map and relate back to multiple features. Traversal from the Alexa speaker search intent node 302 can end up at the FAQ feature node 304 or at the events feature node 306 depending on which slot values are filled (i.e., have values) based on the message elements of the request message.

For example, if the message element is expressed as the Alexa speaker search intent 302 and the person name slot 308 value is filled, the traversal would follow path 314 to the Alexa person information intent 310 and then to the FAQ feature 304.

On the other hand, if a message element is expressed as the Alexa speaker search intent 302, but instead of the person name slot value being filled, the event type slot is filled, then the traversal would follow a path 312 to the events feature 306 by way of the Alexa event location search intent 316 and the Alexa event search intent 318 with which it shares edges.

Similar traversal path analyses apply to traversal paths from Google events 320, Google place information 322, Google general search 324, and Alexa general search 326 message elements to the events feature 306 and the FAQ feature 304.

Note that each of the two features 304 and 306 can be reached by and formulate response message elements to respond to request message elements received from voice assistant devices that conform to two different frameworks (Amazon's and Google's).

Output Processing

After the appropriate matching feature is found by graph traversal, the business logic layer next formulates data structures for the message elements to fit the feature. Once data structures are formulated in a usable way for the feature, the platform will invoke the feature using the structured data, formulate a formal response message conforming to the appropriate protocol and send the response message derived from the feature to the originating voice assistant device. This process may include a reverse mapping of the data structure returned by the feature to the formal response message.

Managing Unfound Nodes and Confidence Scoring

If the search for the appropriate node at which the traversal path should begin turns up no node matching the message element of the received request message, the platform will return a response message to the originating voice assistant device through the API layer that the request is not valid or not supported.

In addition to the simple not-found case, the number of edges to get to the appropriate feature from the initial message element may be too many for the traversed path to be logically considered to have reached an appropriate choice of feature. The number of edges to be traversed to reach the feature can be treated as a traversal path's so-called "confidence score." The threshold of the confidence score beyond which the resulting feature will be not be considered an appropriate choice and the request will be considered bad or unsupported can be configurable. For example, if the confidence score threshold is set to 10 edges, then a message element that requires traversal of only one edge could have a confidence score of 100%, traversal of five edges could have a confidence score of 50%, and traversal of ten edges could have a confidence score of 0%. Any request that exceeds or equals the confidence threshold will be considered invalid.

Features and Modules Layer

The platform supports features that can formulate responses to request messages and in that way assist end-users who are interacting with voice assistant devices. In effect, an end user can trigger a feature to formulate a response by speech that is interpreted by the natural language processor of the voice assistant device into a message element that represents an intention of the end user. The intention could be, for example, to have a question answered or to have an action performed such as turning on a light. The message element is sent in a request message to the API layer for mapping by the business logic layer to a specific feature. The feature processes the intent and generates a response as explained earlier.

A feature is a collection of one or more functional methods that can perform one or more of a variety of actions, such as retrieving data, sending data, invoking other functional methods, and formulating a response to a request message, to be returned to the originating voice assistant device.

An example of such a feature is the events feature mentioned earlier. A user may speak to a voice assistant device to ask a question such as "Are there any wellness events in the Seattle office tomorrow?". The question is sent as a message element (intent) in a request message from the voice assistant device to the platform. At the platform, the events feature parses the words and other parameters of the message element and uses the parsed words and other parameters to retrieve from the platform database (or from a Web service call to a customization server) a list of actual events, based in some cases on a direct mapping of the words and other parameters to a database query or on business logic.

Each feature takes advantage of a wide range of data inputs and custom business logic to generate the response. In terms of the previously discussed event feature example, the event feature can be configured to expect a message element (e.g., a question) having values for any number of placeholder parameters (e.g., slots). The event feature parses the question to extract the placeholder parameter values for further processing of the question. The processing can apply the parsed parameter values against a search index, the database, custom business logic, or a customization server, to obtain one or more values of parameters that characterize one or more answers to the question. The response formulated by the event feature can express the answer to the question using a combination of items of content including one or more of: text, image, video, or audio. The items of content are incorporated as message elements in the formulated response message to be returned to the originating voice assistant device. Based on the message elements contained in the formulated response message, the voice assistant at the voice assistant device may speak a text response or play an audio or video clip along with an image (if the device supports images and video).

The execution patterns supported by features enable, for example, an event feature to process vastly different message elements of request messages using the same methods and processes (represented by the execution patterns). For example, an end user can ask "When is the football team playing next?" or "What's happening at the TD Garden?" and the corresponding message element of the request message can be handled by the same execution pattern of the event feature. The event feature looks for the pattern of event type or time frame to search for corresponding items. In the examples above the event type equates the values "football team" and "TD Garden" to event type and venue. The word "next" in the end user's question implies a search for future events. The statement "What's happening at the TD Garden?" does not include a time frame and the feature handles the statement by default as a question about future events.

In addition, a given feature can support industry-specific uses. For that reason, the platform supports modules, each of which bundles one or more features containing execution patterns and items of content (such as sample items of content) for participant users. The features bundled in a given module will generally have a relationship to one another based on an industry (or some other logical foundation). In some implementations, within the code stack of the platform, a module is expressed as a container that references specific features and items of content. As exposed to a participant user through the user interface of the platform, a module contains features and items of content needed to create, manage, update, and implement a voice experience for end users.

Feature Handling

Examples of methods executed by a feature are an events handler and an FAQ handler. A user might ask the voice assistant a question such as "are there any wellness events in the Seattle office tomorrow?" The FAQ feature parses the message elements in the corresponding request message and, based on them, retrieves a list of events using the database, custom business logic, or a response from a custom web service call.

The breakdown of the business logic used by the business logic layer to handle the message elements of a request message falls into three major steps: feature location search and discovery, feature server request, and response handling.

Figure 10:
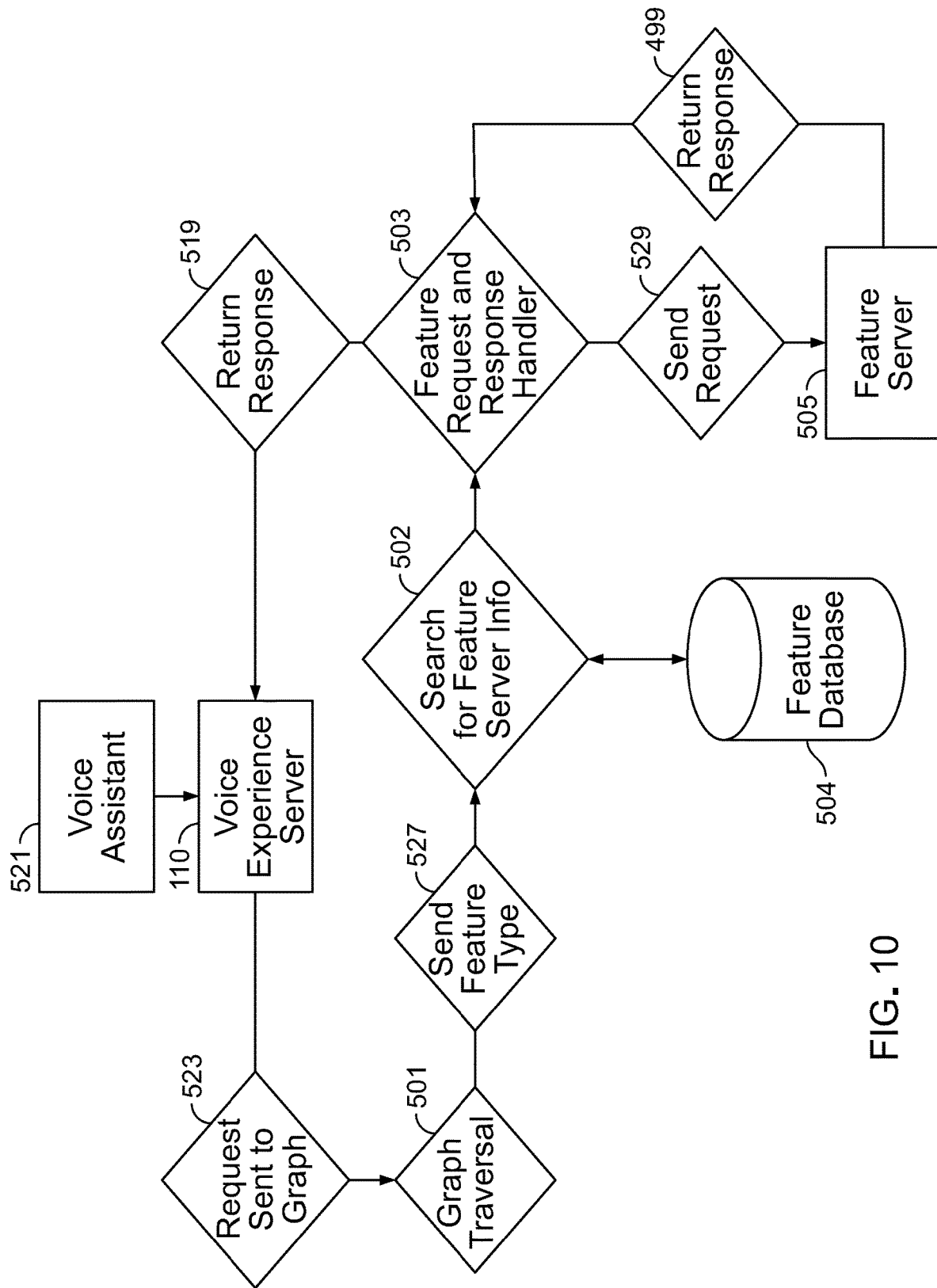

At the end of this process, the response message is sent to the originating voice assistant device Feature Location Discovery As shown in FIG. 10, when the voice experience server 110 receives a request message from the voice assistant device 521 and parses the message elements in the request message, the server sends a request 523 for a graph traversal. Once the graph has been traversed 501 for supported types of voice assistant devices, the features and modules layer is aware of the type of feature 527 represented by the message elements of the request message. The feature type can be represented by a unique identifier such as a GUID, a UUID, or a key-word. With this unique ID, the features and modules layer can search 502 a feature database 504 to find the full information (including the execution pattern and other information) defining the feature. Once the features and modules layer has information about the feature, it can find where a given voice application has registered this feature. The registration or metadata about the feature can exist on a server 505 that is either or both of an internal, managed server of the platform, or a customization server controlled by the platform participant. Each of these servers can be scaled independently from the platform to appropriately handle the fluctuation of lookup requests it needs to process separately from any other feature server.

For example, if traversal of the graph 501 leads to a selection of the events feature, this feature type (in this case, the feature type "events") would have a unique identifier such as a592a403-16ff-469a-8e91-dec68f5513b5. Using this identifier, a process of the features and layers module will search against a feature management database 504 such as a PostgreSQL database. This database contains a table having a record of the events feature type, the related voice application, and the feature server location that this voice application has selected to use for the events feature. This feature server location record contains a URL for the location of the server 505 such as https://events-featture.voicify.com/api/eventSearch as well as the expected HTTP method that the feature server accepts such as HTTP GET. This feature server location record does not have to contain a URL managed by the platform. This server location can be external by implementing a custom feature such as https://thirdpartywebsite.com/api/eventSearch.

Once the platform has found the appropriate feature server 505 it sends a service request 529 for the feature server 505 to execute the feature type using the parameters derived from the message elements of the request message and waits for a response 499.

Feature Server Request

Once the feature server 505 is found, a service request is sent to it by creating an HTTP request containing HTTP headers to identify that the request is coming from the features and modules layer of the platform and an HTTP body that contains words and parameters parsed from the message elements of the request message from the voice assistant device and is expressed according to a corresponding feature request protocol. This service request is then processed on the feature server, for example, by using the words and parameters from the message elements to search for matching content items. Results of the search are returned to the features and modules layer expressed according to the service response protocol defined for that feature.

Each feature defines a feature request protocol and a feature response protocol. These protocols define the format and structure of service requests and service responses used to send and receive responses and requests to and from the feature server. The feature request and feature response protocols define rigid formatting requirements. FIGS. 11A and 11B are an example of a JSON version of a feature request protocol and FIG. 12 is an example of a JSON version of a feature response protocol. By defining strict feature request and feature response protocols, the platform can be confident that the feature server will be able to appropriately handle each feature request and provide a proper feature response that the features and modules layer of the platform can process properly. This structure also enables customizing feature servers built into the platform to enable developers to create their own customization feature servers to handle requests and responses for a given type of feature.

The general structure of a feature request protocol includes information about the feature that is the subject of the service request, the content of the service request, and information about the message elements included in the message request from the voice assistant device that were used to traverse the graph to find the feature. The structure also enables feature servers, whether managed by the host of the platform or created as customization feature servers on behalf of platform participants, to handle requests and responses as they are processed by or from the voice assistant devices natively. This enables the custom and platform feature servers to exercise the full power of the framework API of each type of voice assistant device.

For example, when sending a service request to an events feature server, whether internally managed in the platform or managed at a third-party server, the feature and modules layer will send an HTTP request with the headers listed below as well as the HTTP Body of the example feature request protocol in FIGS. 11A and 11B: -Authorization: 1d91e3e1-f3de-4028-ba19-47bd4526ca94; -Application: 2e1541dd-716f-4369-b22f-b9f6f1fa2c6d The -authorization header value is a unique identifier that is automatically generated by and is unique to the voice application and the feature type. This value can be re-generated by the platform participant to enable the feature server to ensure that the request is not coming from a malicious third party. The -Application Header value is the unique identifier for the voice application to enable the feature server to validate that the request is coming from an authorized voice application.

Response Handling

Once the feature server 505 has finished processing a feature service request, it needs to return data expressed according to the feature response protocol. The feature service response 499 contains information about the items of content that were found by the feature server and can contain information about rich media items of content for voice assistant devices capable of presenting richer content items. The feature service response can include URL pointers to the file locations of, for example, images, videos, or audio files. The data included in the feature service response is validated by the features and modules layer to ensure the conformity to the service response protocol and that the data contains valid information.

If there are errors in the validation of the feature service response or if the original feature service request times out or is invalid, an error response message is sent to the voice assistant device for the original request message received by the API layer.

If the feature server returns a successful feature service response that passes validation, then the feature service response 519 is processed by the features and modules layer of the voice experience layer 110 to formulate a response message to be sent to the voice assistant device. This process involves mapping the feature service response to the protocol of the framework of the voice assistant device 521 including mapping media files and other items of content to the appropriate form. If the voice assistant device supports richer media item formats such as video, then this process will prioritize the richer media items. Otherwise the process will fall back to simple text content to be spoken or read by the voice assistant to the end user, for example, if there is no rich media included in the response. Using the message elements included in the response message, the originating voice assistant device will be able to render or present the response to the end user. If the original request message came from a generic or unsupported AI device or voice assistant device, then a generic response message that contains raw versions of the items of content from the feature service response will be returned to enable the unsupported AI device or voice assistant device to itself determine whether and how to use or the render each item of content.

For example, if the voice assistant device that originated the request supports rendering richer content other than just voice, such as images or video (as the Amazon Echo Show does), then the response formulation process of the features and modules layer will map the URLs contained in the feature service response for rich media items and to rich media properties in the message elements of the message response conforming to the framework protocol of the voice assistant device. Certain features can enable the voice assistant device to present multiple types of media items at the same time such as images and text while also reading an answer to the end user. The business logic layer of the platform will be aware of the configurations of supported voice assistant devices in order to formulate the response message according to the most optimal configurations. For voice assistant devices that do not support rich media items, the default behavior of the features and modules layer will be to formulate the message elements of the response message as a voice response causing the voice assistant device to speak the text sent to it in the response message.

For example, if the request message were to come from a voice assistant device such as the Echo Show that supports images and text, the feature service response provided to the events feature may be as shown in FIG. 13. The feature service response shown in the example of FIG. 13 enables the results in the text response to be both spoken and shown visually in the card field of voice assistant device and also maps the image URLs to the proper card image URLs in accordance with the Alexa response message protocol.

Now take the same example feature response, but assume the voice assistant device that made the request is an Alexa Echo Dot, which does not support presentation of visual items of content. The Alexa response protocol could be, more simply:
{
  version: string,
  sessionAttributes: {
  key: value
  },
  response: {
  outputSpeech: {
  type: PlainText,
  text: The Football game is at 3:00 pm at the Stadium today
  },
  shouldEndSession: true
  }
}

This example only maps the text from the feature response to the text of the outputSpeech property of the Alexa protocol which in turn is spoken by the Alexa Echo Dot to the user.

Feature Content Search

Figure 14:
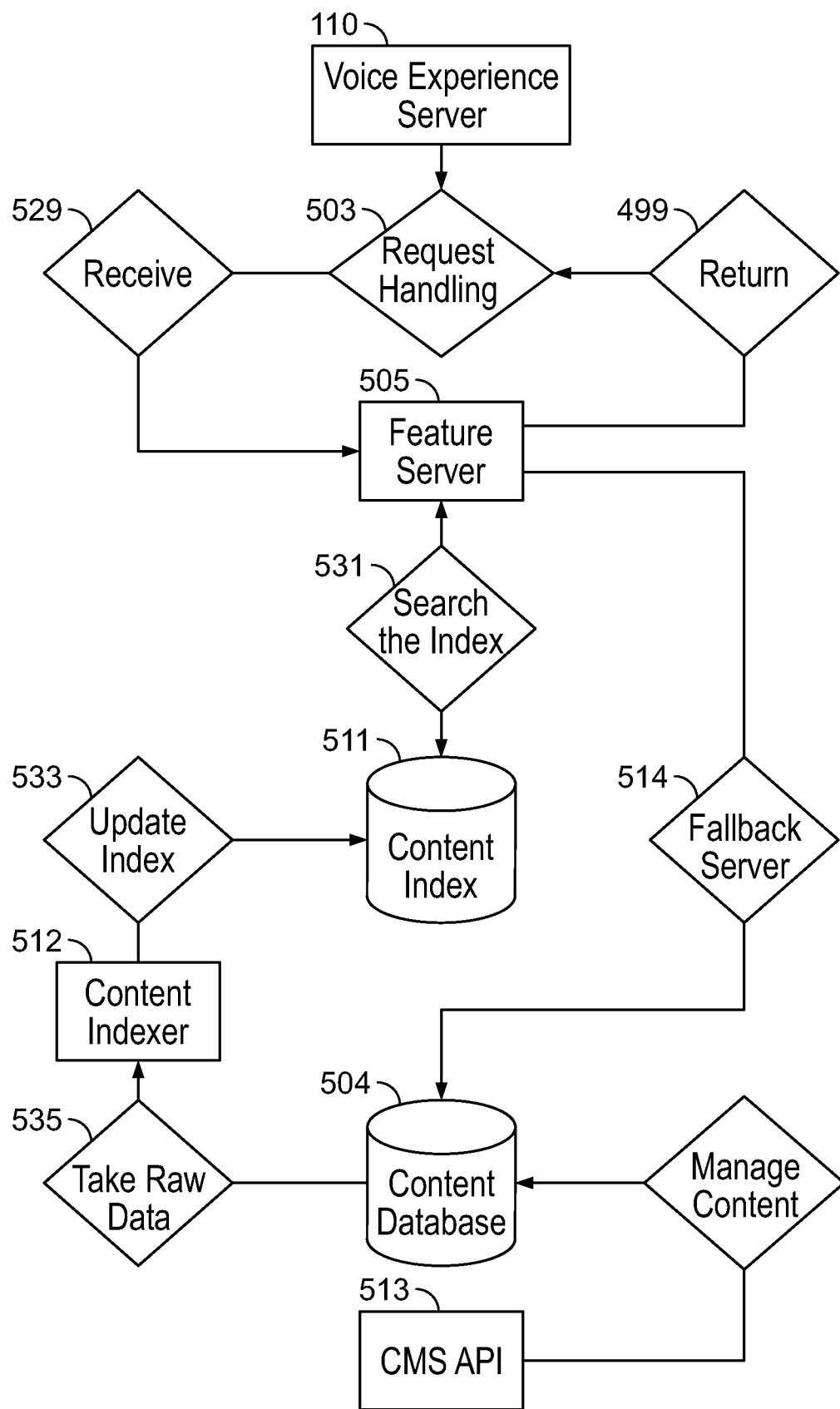

When a feature processes message elements of a request message routed to it as a result of graph traversal, the processes of the feature must search for the content items to include in the response as illustrated in FIG. 14. The feature server 505 is responsible for finding and including content items that are relevant based on the feature service request. In some implementations, the feature server searches for content items 510 within a search index 511 of managed content items authored or otherwise controlled by other platform participants. The content search index 511 provides an efficient repository based on structured content items for the feature server to query. Identification of content items returned in the search results are either of content items that exactly match the query, or are most likely matches based on a search confidence, or include no content items based on zero returned content items or a low confidence score for returned items.

There are two key aspects that enable the feature server to return the proper content items: content indexing 512 and content search 531. Content indexing and content search work together to create content items in the content database 504 that are searchable by the feature server 505 to provide content items to the features and modules layer for use in formulating the response to the voice assistant device.

Content Indexing

As stored in the database of the platform, each item of content has certain fields and properties that contain simple information such as text content, identifiers, URLs, and others that are easily searchable when put into an elastic search index 511. In order to improve performance of the feature server, all content items that are reachable by the feature process should be added to the elastic search index 511. Certain content items used by the features may have one or more particular properties that are treated as more valuable in the index and weight can be added to those properties in the fields of the index. The weighting enables the elastic search index to prioritize searches against the fields in a descending order of the weights of the fields. The weighting results in a score when a search against the index has multiple hits on different fields of a given item of content.

For example, if an event content item has the following fields, the indicated weight values (on a scale of 1-5) can be associated with them: event name—4, event location—2, event start date/time—5, event end date/time—1, event details—2, and event summary—2.

This weighting would prioritize searching against the start date/time of the event and the name of the event. Therefore, if there are two events with similar descriptions but different start times and the request contains a particular date to search against such as tomorrow or March 3rd, then the top result will be the event content item that has the start date and time that matches that date request. If there are two events happening at the same time, then the next field against which the search is prioritized is the name. For example, if there are two events with the same start date: 5/2/2018 3:00 PM, but one has the name of "basketball game" and the other is "hockey game," then the search for a message element such as "What time is the hockey game on May $2^{nd}$?" would find the second event with the name hockey game as the top result and return that instead of the basketball game event.

Content items are added, updated, and removed from this elastics search index automatically when a participant user updates the item of content using the content management system 513. If a participant user deletes a content item by marking it as removed in the database (or deleting it altogether), a content indexer process 512 will remove that content item from each elastic search index that contains the content item. Likewise if a participant user updates properties of a content item or adds a new item of content, those items 535 are updated 533 or added to the elastic search index. The index can also be manually flushed or reset. Doing this will force the content indexer process to rebuild the index by querying the database 504 for content items that should be indexed and then uses that data to rehydrate the index and cache.

For example, suppose a platform participant adds a new content item for the events feature having the following properties and values: event name: basketball game, event location: gymnasium, event start date/time: May 2nd, 3:00 PM, event end date/time: May 2nd, 5:30 PM, event details: The Rams play against the Lions for the 3rd time this year, event summary: Tickets start at $15 and the doors open at 1 PM! Buy some merchandise to support your team!

Once a participant user marks a content item as live or publishes an event, the content item is immediately added to the elastic search index and the event is available to be found in a search by the feature server 505 on behalf of the events feature. Suppose a participant user goes back to the content item in the CMS and updates a property such as: event location: Gymnasium at 100 Main Street. The update process would update the record for the content item in the database and also update the content item in the elastic search index. Suppose a disconnect happens from the voice experience server 110 or the content management system 513 to the elastic search index 511 that can cause a desynchronization, such as the elastic search index going down for maintenance. Then when the connection is restored the elastic search index would be flushed, that is, all content items in the index will be removed. Once this is done, the indexing processor 512 will communicate between the database 504 and the elastic search index 511 to re-add all appropriate content items. Lastly, if the participant user were to remove the basketball game event from the CMS, then the event would be marked as removed in the database and deleted completely from the index to ensure that it wouldn't be found by any feature servers.

Content Search

Once a content item is added to the database and to the elastic search index by the content indexer, the item is ready to be found in a search by the feature server. If the index is not hydrated (has no data) due to an active flush of the cache and index or for any other reason, the feature server 505 will fall back to querying a content database 504 directly using traditional fuzzy search techniques 514. The fuzzy search produces lower confidence results for content items but ensures that content items are reachable when updates are being made to the system or if the index 511 becomes corrupt. In some implementations, the content database is a relational database 504 that contains information that is managed in the content management system 513 including information about features a given voice application has enabled and includes items of content.

When the index is populated and reachable, the feature server will execute a search against the index. Primary filters can enable faster searching such as searching only for content items that match the feature type that the feature server represents. This enforces the rule that a given feature server will not return content items associated with another feature. Searches against the index will return a collection of results that match the search request. If there are no matches, then the message element of the request message cannot be successfully processed and an appropriate response message will be returned to the voice experience server from the feature server to explain that the feature server is unsure what to do with the message element. When a single item of content is found in the search, also known as an exact match, then that one item of content will be returned as the message element of the response to the voice experience server. If many items of content are found to match the message element, then the item of content with the highest score based on the weights of the fields searched will be returned as the message element to be included in the response message.

In the example above involving the basketball game and the hockey game events, the total potential score for a perfect match would be the sum of the weights of all indexable fields: 16. If a feature service request being handled by the feature server contains information about the start date/time and nothing else, the maximum achievable score is 9. If the search query includes the same start time for both events and the name of hockey game, then the score for basketball game would be 5 and the score for hockey game would be 9, and the hockey game event information would be returned as the message element to be included in the response message to be sent to the voice assistant device.

Feature and Module Customization

The platform enables platform participants to create custom modules in addition to the platform's standard supported and managed modules. When building a custom module, a participant user can select registered feature types to add to the module. The platform also enables developers to create custom feature servers that override the supported feature servers during the execution a voice application.

There are two aspects to customizing the way content items are retrieved and managed in the context of customization: custom modules and custom features.

Custom modules are non-technical elements and require no separate development or maintenance by the platform participant, while custom features require a developer to create and maintain a web server that the platform can communicate with to use the custom modules and cause the execution of the custom features.

Creating a Custom Module

Figure 15:
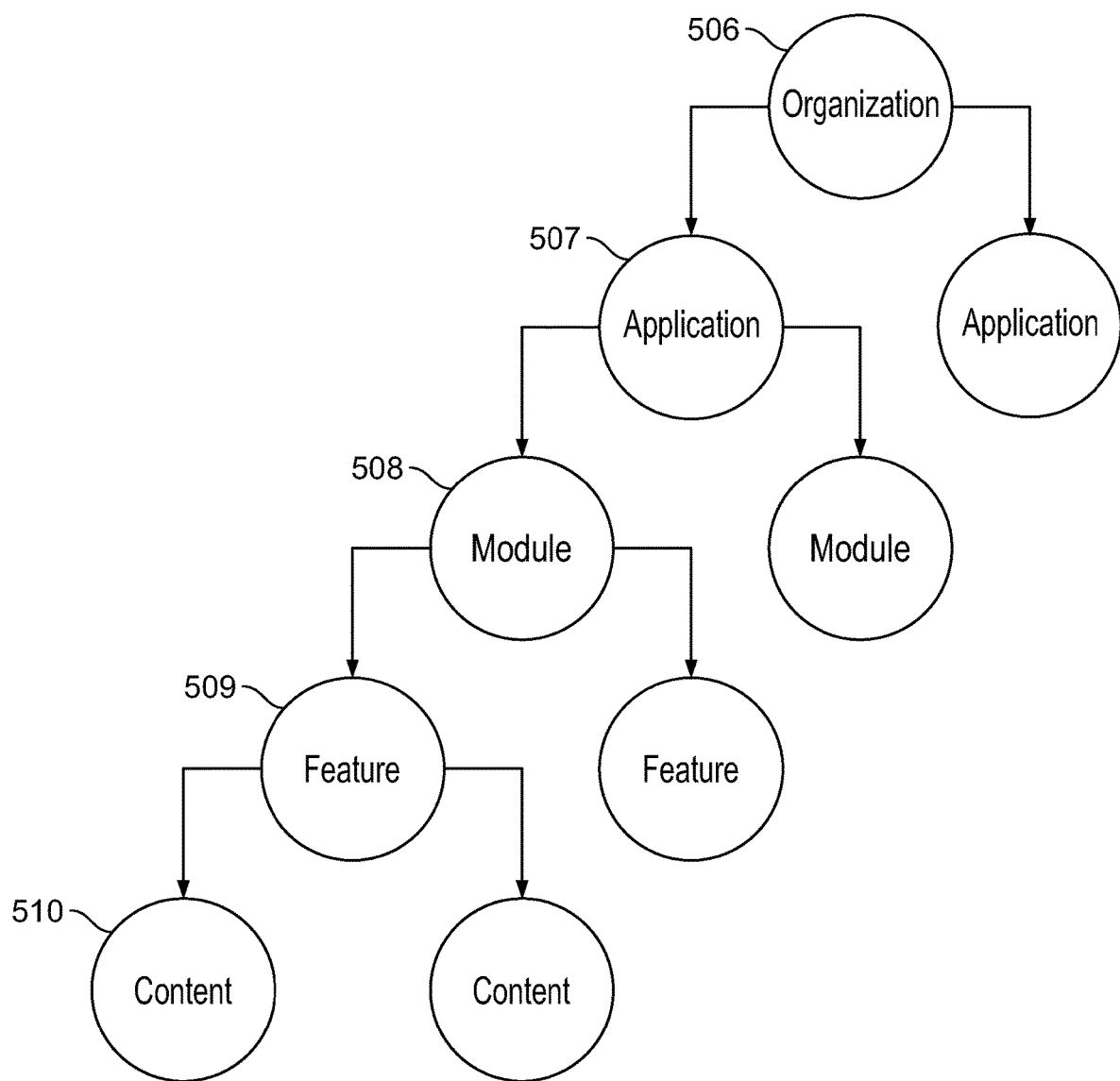
Figure 16:
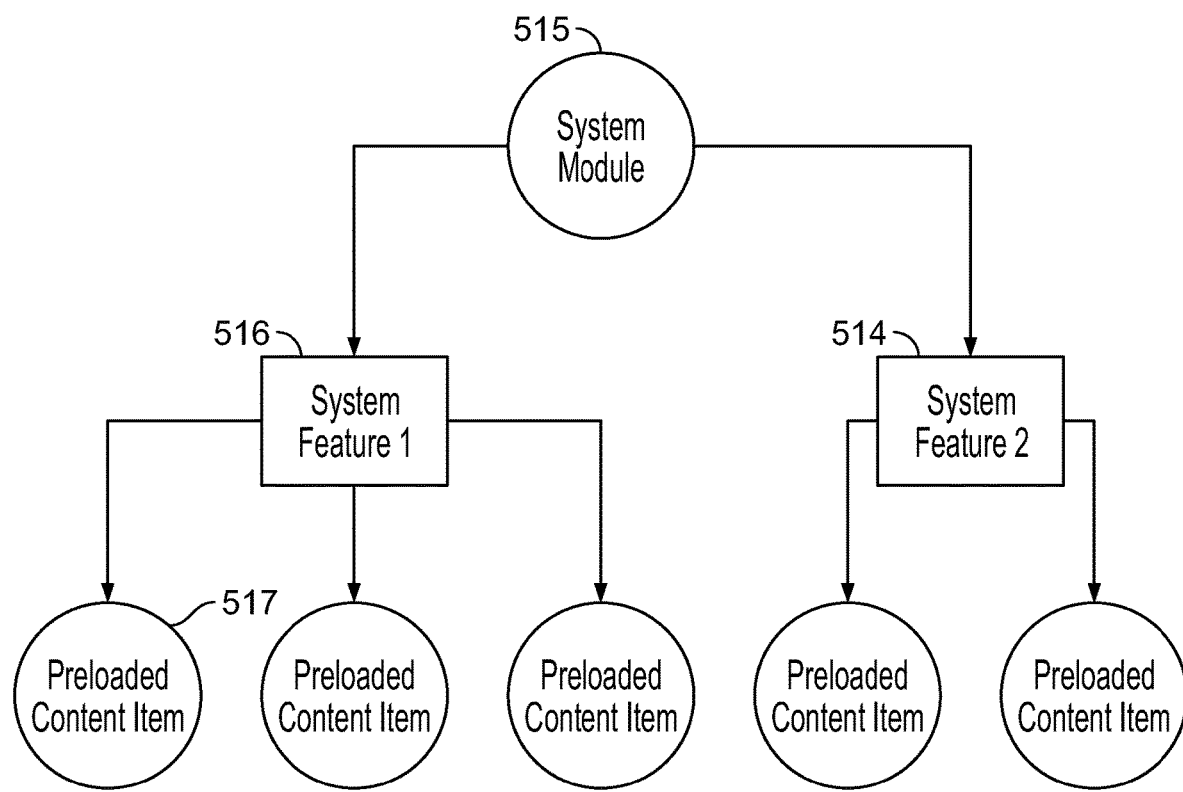
Figure 17:
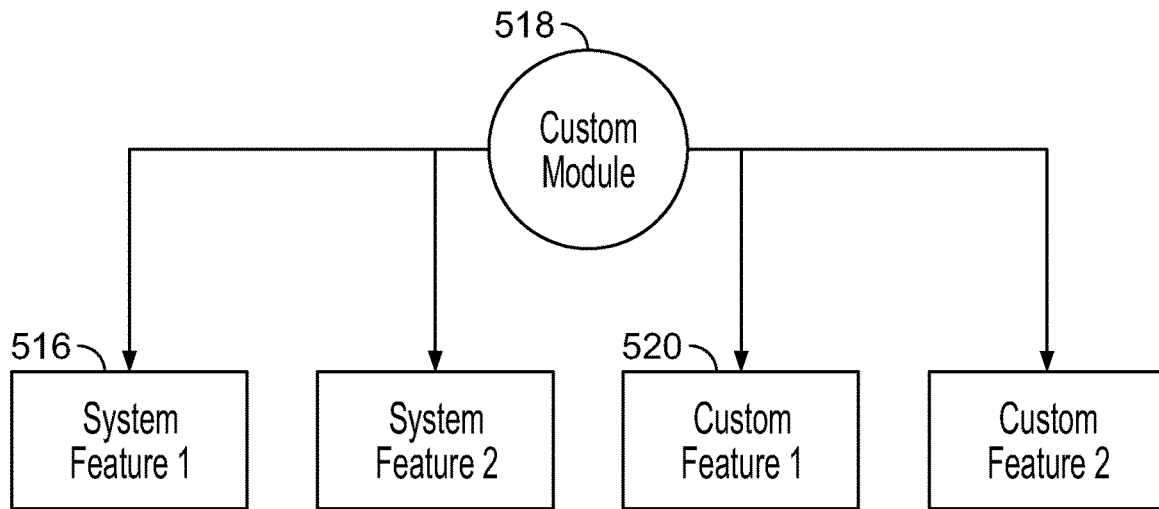

At a high level, a module 508 is a collection of features 509 and contextualized content items 510 within those features as shown in FIG. 15. As an example, the platform can be pre-configured to include a set of industry modules such as a higher education module or an employee wellness module as shown in FIG. 16. When adding any of these modules 515 to a voice application 507, the platform can pre-populate the features 516, 541 of the module with sample (e.g., standard) items of content 517 that the platform participant 506 can use, update, or remove to replace with their own items of content. The pre-populated (e.g., standard or sample) features 516, 541 could include frequently asked questions, quick poll, and survey, as examples. The platform maintains and hosts the pre-populated modules 515; however, platform participants are not limited to these prepopulated modules and their features. If a platform participant wishes to mix and match features of different modules or wants to create a set of features having a different context than the existing modules enable, the platform participant can create one or more custom modules as shown in FIG. 17.

A custom module 518 must be given a unique name within the context of the voice application to which it belongs. Platform users can also give descriptions to their modules to help solidify the context being created for its features and items of content. When a developer creates a module with a unique name it is registered within the platform. Once the platform participant has created the module by unique name, the owner can begin to add features to it. The features can be pre-existing (e.g., standard or sample) platform-supported features 516 or custom features 520. If an added feature is a pre-existing feature 516, the owner can then start adding content items to the feature within the custom module 518.

Figure 18:
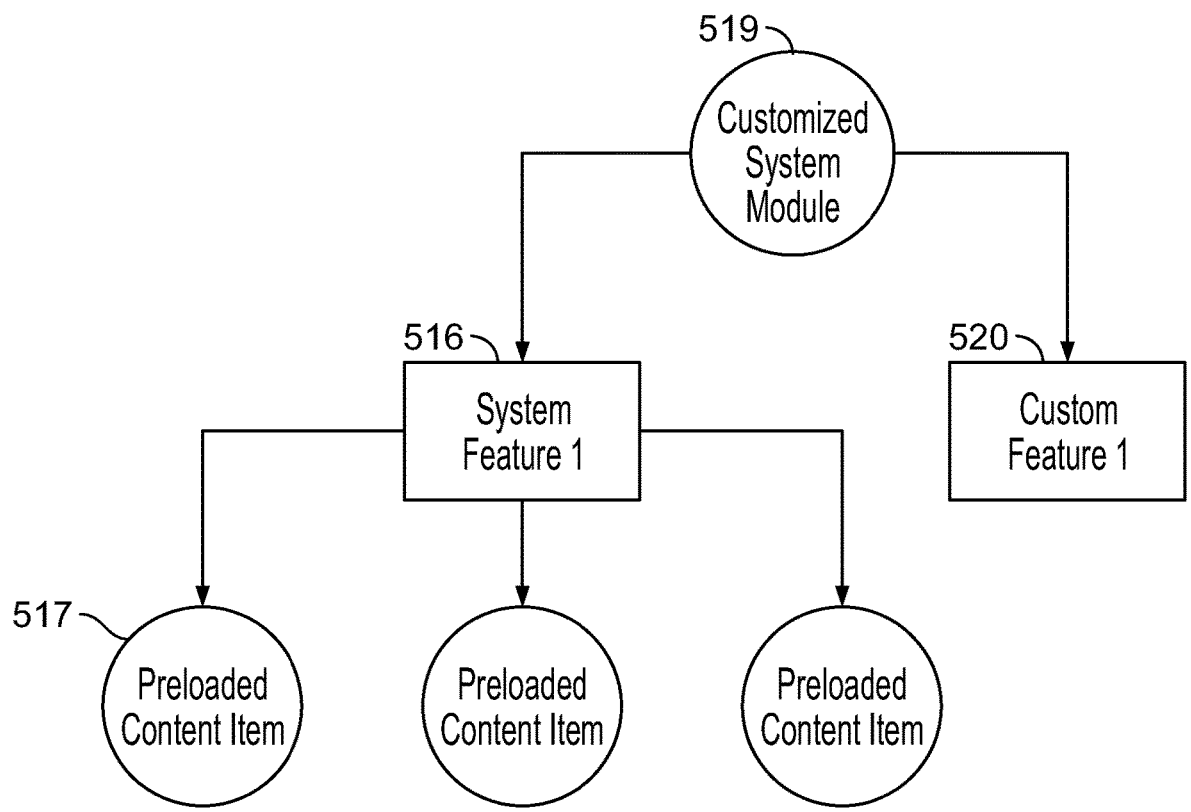

In addition to creating a new custom module from scratch, a platform participant can also add an existing (e.g., standard or sample) industry module to a voice application and adjust the features within it by adding features, removing features, or using a custom features in place of or in addition to pre-existing features to form a customized module 519 as shown in FIG. 18. Adding features to an industry module will not populate content items within the feature as is the case with the pre-existing features. For example, if the voice application already uses the employee wellness module and a participant user wants to add another feature to the module that isn't included or that was removed previously, the participant user can, through the user interface of the platform, view the remaining supported feature types that have not already been added and can add the desired feature to the module. The participant user then can choose whether to use the pre-existing feature implementation or register a custom feature from a third party or a custom feature that the participant user has developed on its own.

Creating a Custom Feature

Platform features are implemented by a combination of a feature server and the feature type it represents. A feature type defines an expected feature request protocol, a feature response protocol, and the location of a feature server to which to send HTTP calls when the feature type is identified as the appropriate feature found during graph traversal. This structure applies both to supported, managed features and to custom features that are created to extend the platform. Platform participants may want to do this if they have pre-existing content items stored other than in platform databases or content items that are managed by another system, if their security standards do not enable content items to be managed by an external system such as the platform, or if they want to enhance or change the functionality or behavior of the platform.

If a platform participant wants to create a custom feature, the participant can create a publicly accessible web server (as a custom feature server). The customization feature server has an HTTP endpoint that accepts the expected feature service request expressed in accordance with the protocol, in the HTTP body and returns the expected feature service response expressed in accordance with the protocol. In some implementations, this endpoint must return the feature service response within a restricted timeframe to ensure that the experience for the end user is not degraded by slow performance outside the control of the platform.

Figure 19:
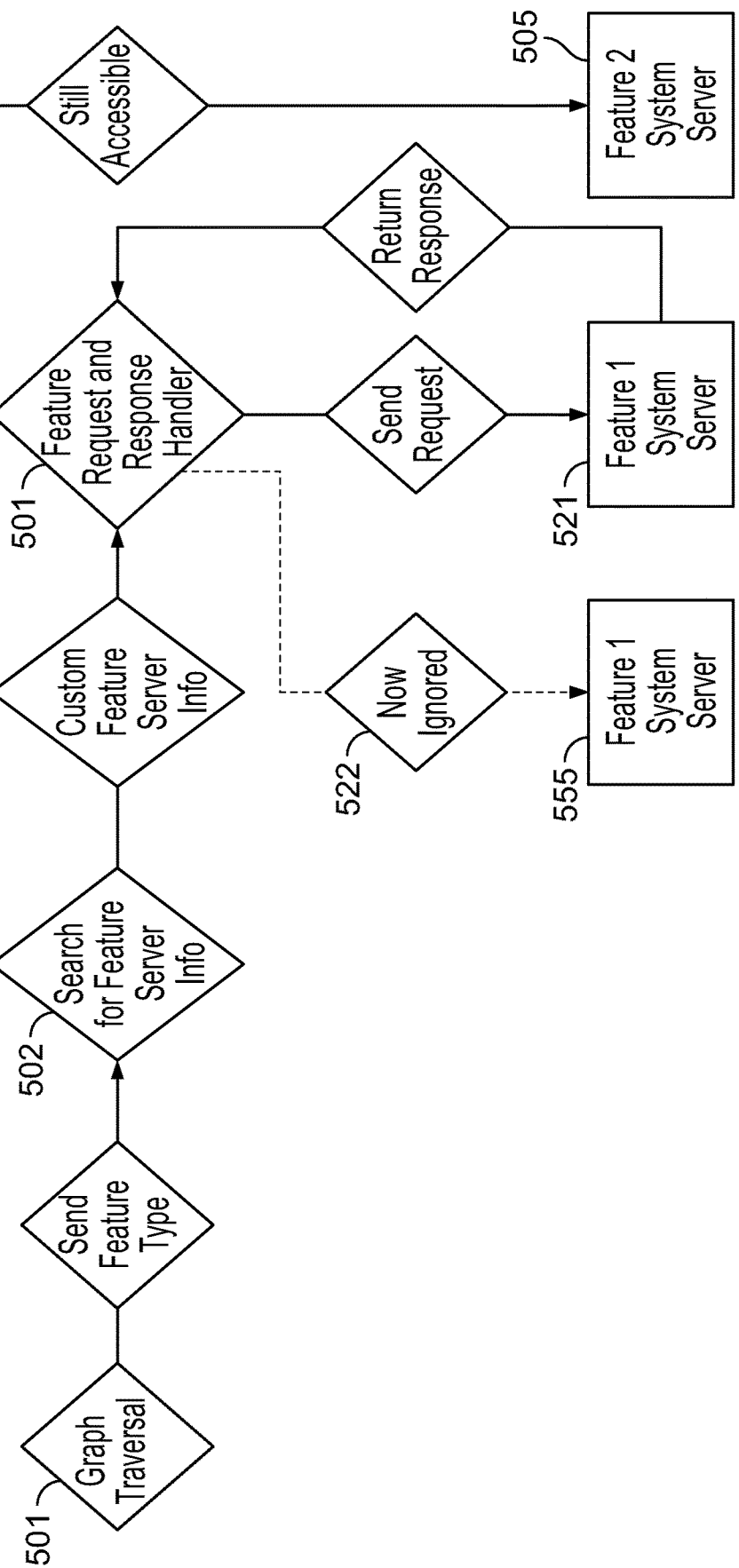

Custom feature servers can use the data from the feature service request in any way as long as an expected feature service response is returned. The custom feature servers can use message elements of the original request message from the voice assistant device, track any internal analytics, break apart the message elements of the request message, and provide functionality that is unique to the voice assistant device or the voice application that sent the request message. As shown in FIG. 19, for example, if a platform participant already manages its event information using a third-party service and doesn't want to migrate that data to the platform, the participant can instead develop a custom events feature server 521 to replace the default (supported) events feature server 555. However, this custom events feature server 521 must accept feature service requests expressed in accordance with the same protocol as the platform's events feature server 555 and return feature service responses expressed according to the same output protocol as the platform's server. Once the developer has created this publicly accessible custom events feature server, the developer can update the voice application in the CMS to change the feature server location to the custom event feature server's URL.

Figure 20:
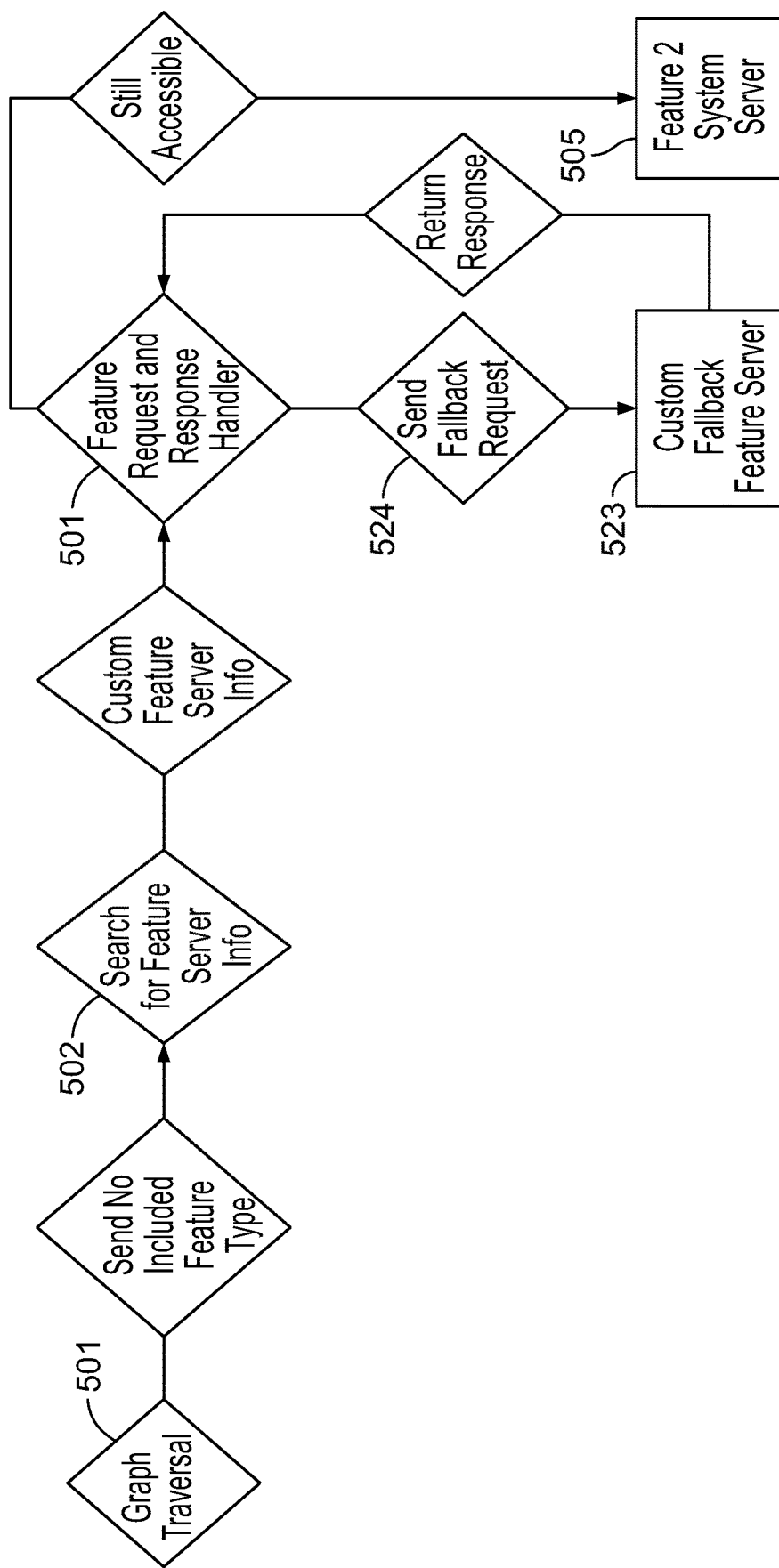
Figure 21:
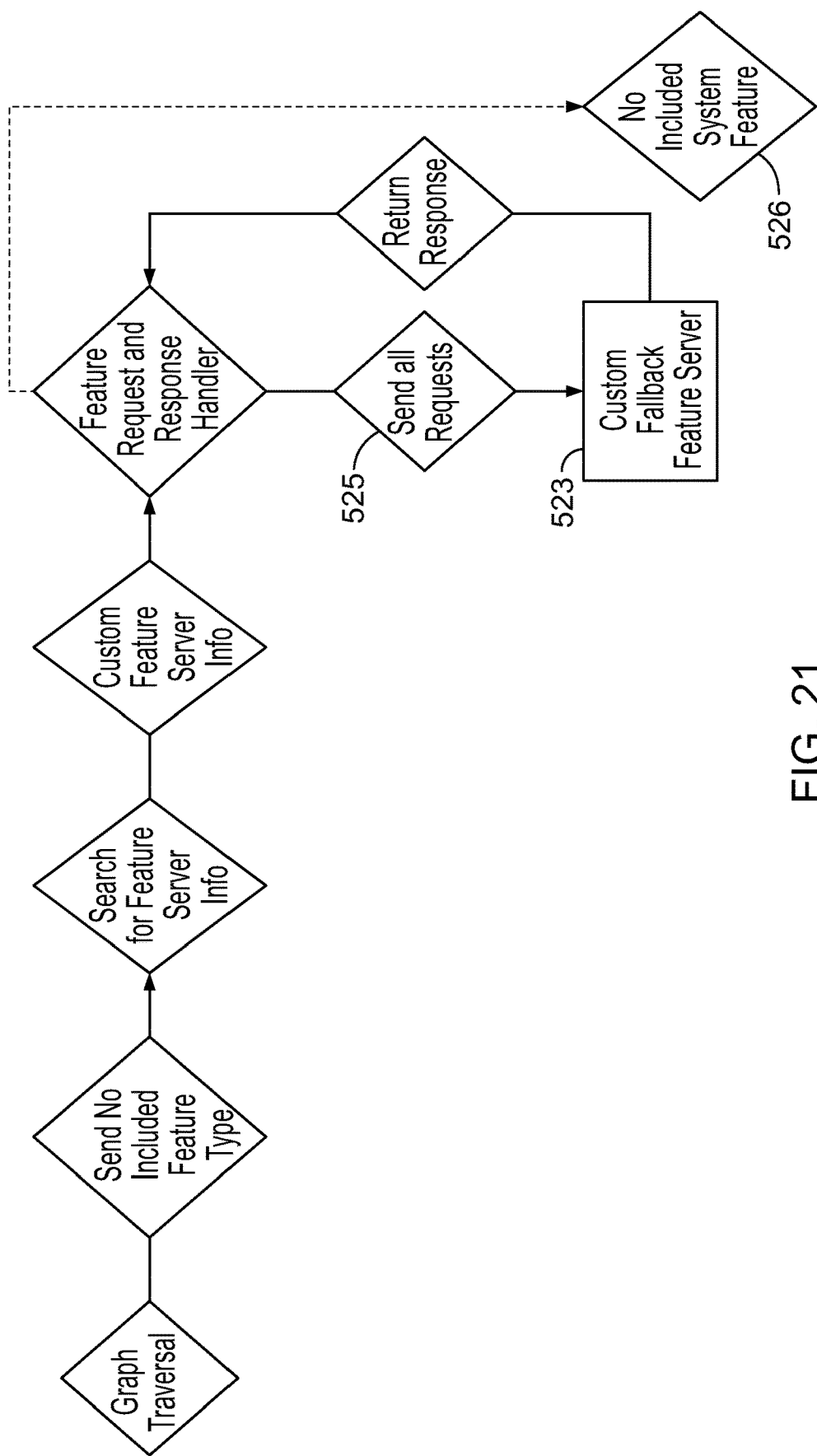

Every custom feature server must be of an existing feature type. This is required for the platform to know to send the feature service request to the proper feature server. As shown in FIG. 20, however, a feature server can also be registered as a custom fall back feature server 523 so that, for the given voice application, if a request from a voice assistant device cannot be matched to a feature type that is registered to the voice application, the feature service request 524 can be sent to the fall back custom feature server 523. This arrangement enables full customization of how responses are handled such as creating a voice application including a custom module with no other features but a fall back custom feature. As shown in FIG. 21, then all feature service requests 525 would be forwarded to the custom feature server 523 which can be designed to handle all message elements of response messages itself without using any platform-supported features 526. These types of custom features still require that the feature service response returned to the voice experience server match the protocol of the expected feature service response for the fall back type. The feature service request for this case can include the message element of the original message request from the voice assistant device and the information that the message element is attempting to pull such as the feature type it most closely matches. As shown in FIG. 21, the process executes this way even if that feature type is not registered in the voice application.

For example, if a given voice application does not have the events feature enabled in any of its modules, but a request message comes to the voice experience server that includes a message element for the Alexa event search, the graph traversal will not be able to find a matching feature because the appropriate match is the events feature. If the voice application has registered a custom fallback feature, then the process would skip the graph traversal step and instead find the fallback feature server information from the content database and send the original native Alexa event search message element to the custom fallback feature server. The custom feature server can then apply any desired processing to the raw Alexa event search message element and return a structured feature service response that is specific to the fallback feature type. If there are no registered features other than this custom fallback feature server, then the graph traversal would always be skipped in favor of proceeding directly to the custom feature server.

Content Management Layer

Interactions between a voice assistant and an end user are provided by a voice application and take shape based on content items managed by the platform. The platform enables participant users to create, modify, and delete content items used by features as needed. These participant users can work with content items based on a feature through the user interface of the platform using a web browser or mobile device. As discussed earlier, a feature can be implemented as a handler for a specific type of message element such as a request for information about an event. A feature also provides a consistent structure for adding items of content based on protocols defined by the platform.

For example, an event feature can include the following properties: event name, event location, event start date/time, event end date/time, event details, and event summary, among others. With respect to such a feature, a participant user simply adds, modifies, or removes information 622 (FIG. 22) about events using fields presented within the platform's user interface. The items of content for the feature are added to a search index that is queried when an end user of a voice assistant device poses an event-specific question.

Figure 23:
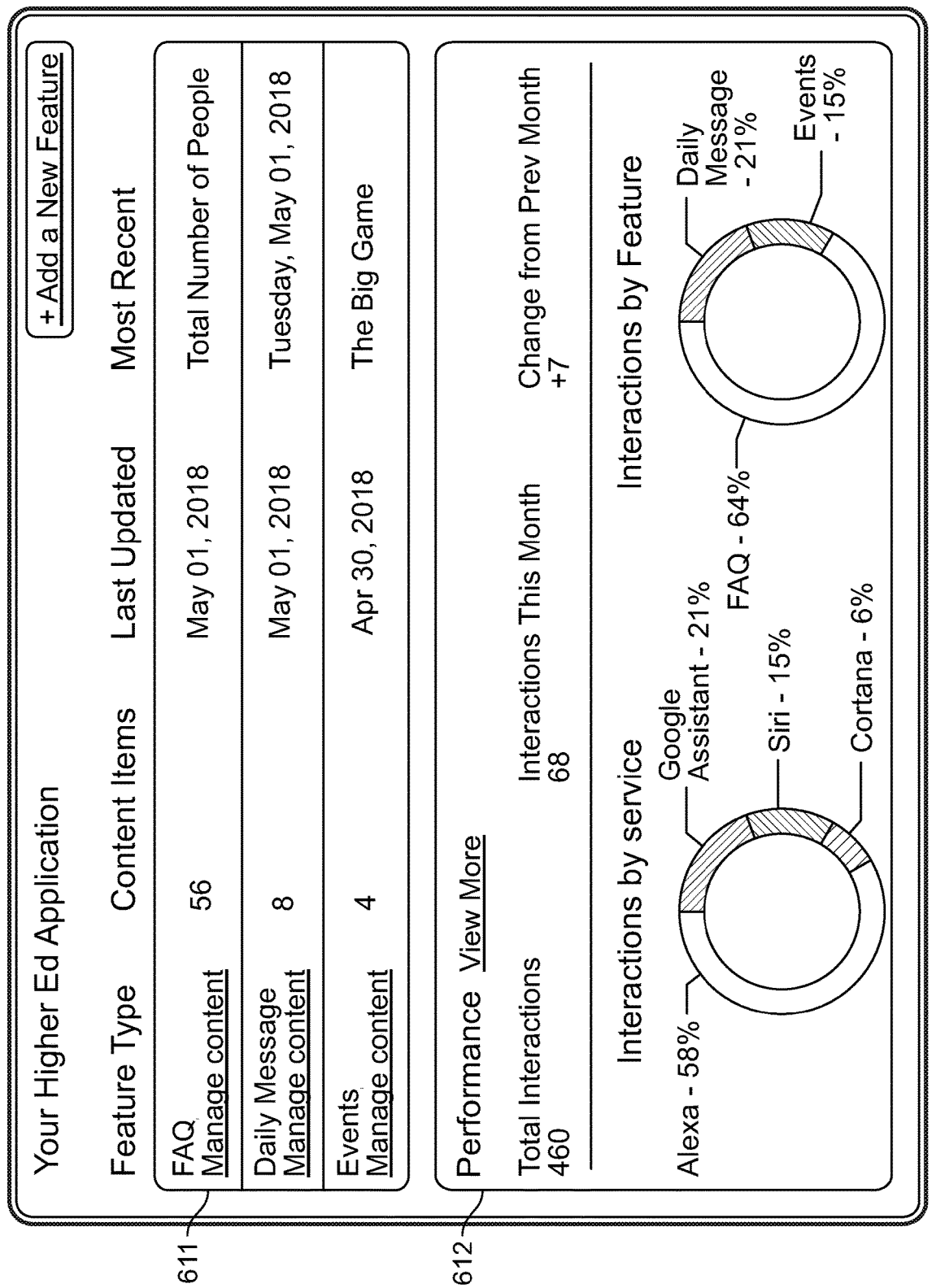

As shown in FIG. 23, a participant user can manage the items of content of a voice application for all selected feature types within a given module (whether a platform-hosted module or a custom module) using the content management system user interface 611. In addition, a participant user can view cross-device (e.g., cross-framework) analytics 612 based on usage data of a given voice application across multiple frameworks of voice assistant devices, because the universal voice application platform can process request messages from all such voice assistant devices.

For purposes of adding items of content, the user interface sends content management requests to an API of the CMS using HTTP. The CMS API then manages where to store the items of content. Content items can include text or media assets such as audio in mp3 format or videos in mp4 format. Content items in the form of media assets are uploaded to a blob storage or file management system, and meta data and related content items are stored in a relational database that is scalable.

The CMS API is not exclusively for content items that are related to feature types, but also enables participant users to manage their accounts, voice applications, modules, features, and other aspects of the platform including registering custom modules and custom features. Each item of content is structured specifically for the corresponding feature type in that the properties and fields of items of content uniformly conform to a common protocol for expressing items of content for any given feature type. Each content item also is related to a specific voice application to prevent platform participants other than the appropriate platform participant to have access to a voice application view in the user interface or to use the content items of the owner. Although a given feature type can be used across multiple modules, feature content items are directly associated with the modules that manage them. For example, a feature content item value that represents the answer to a frequently asked question and is the same for two modules is stored in the database twice.

Support and Guidance from the CMS

Figure 24:
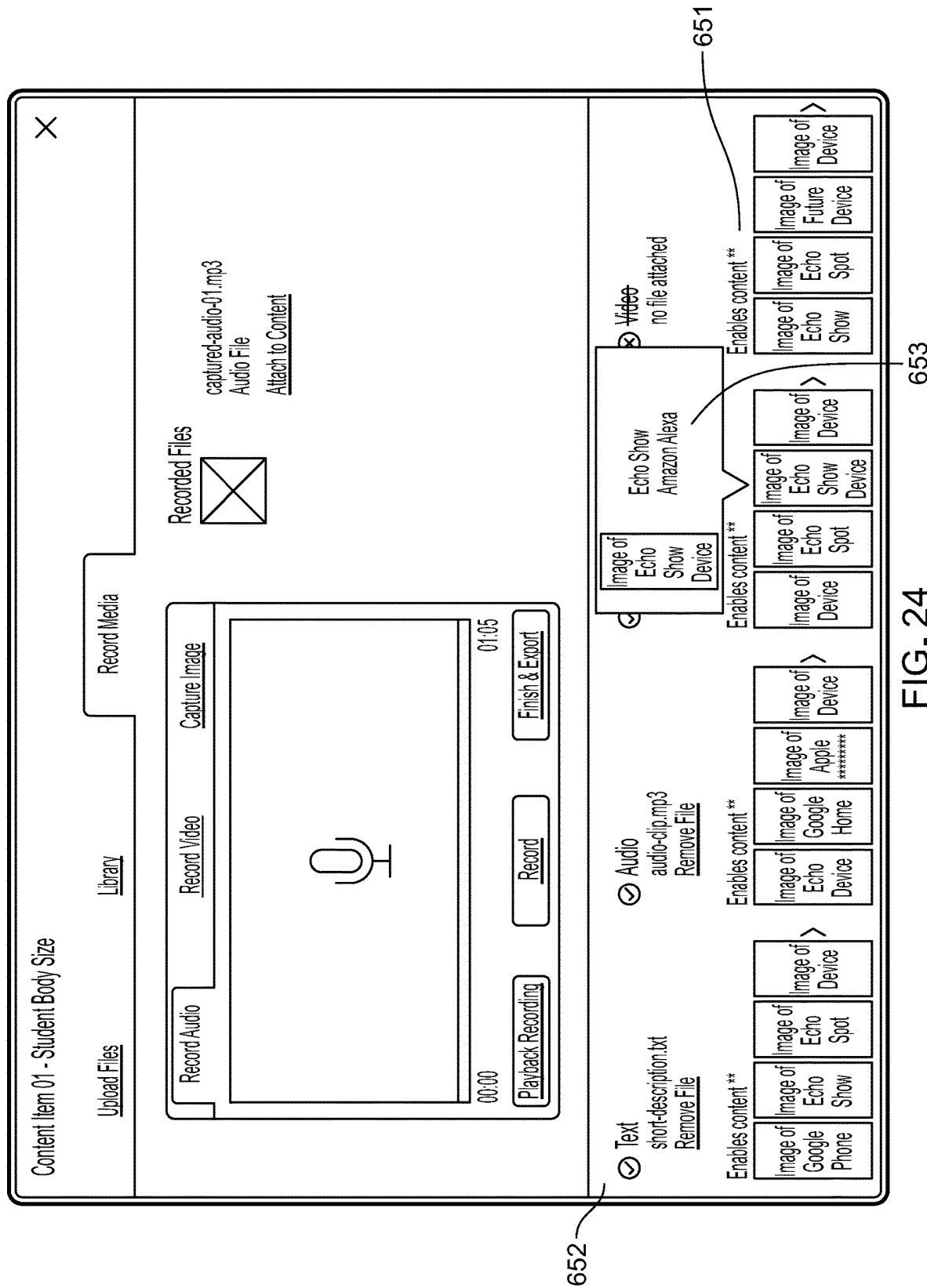

Voice assistant devices vary in how they handle items of content based on their internal hardware and software. One voice assistant device may support video, audio, images, and text while another may only support text and audio. The CMS can provide guidance and real-time feedback regarding content items added by participant users. For example, as shown in FIG. 24, a participant user may enter a text content item related to an event in addition to an audio file and an image also related to the event 652. The CMS interface will indicate the types of voice assistant devices that support the submitted type of content item 651, 661 (FIG. 26).

Figure 25:
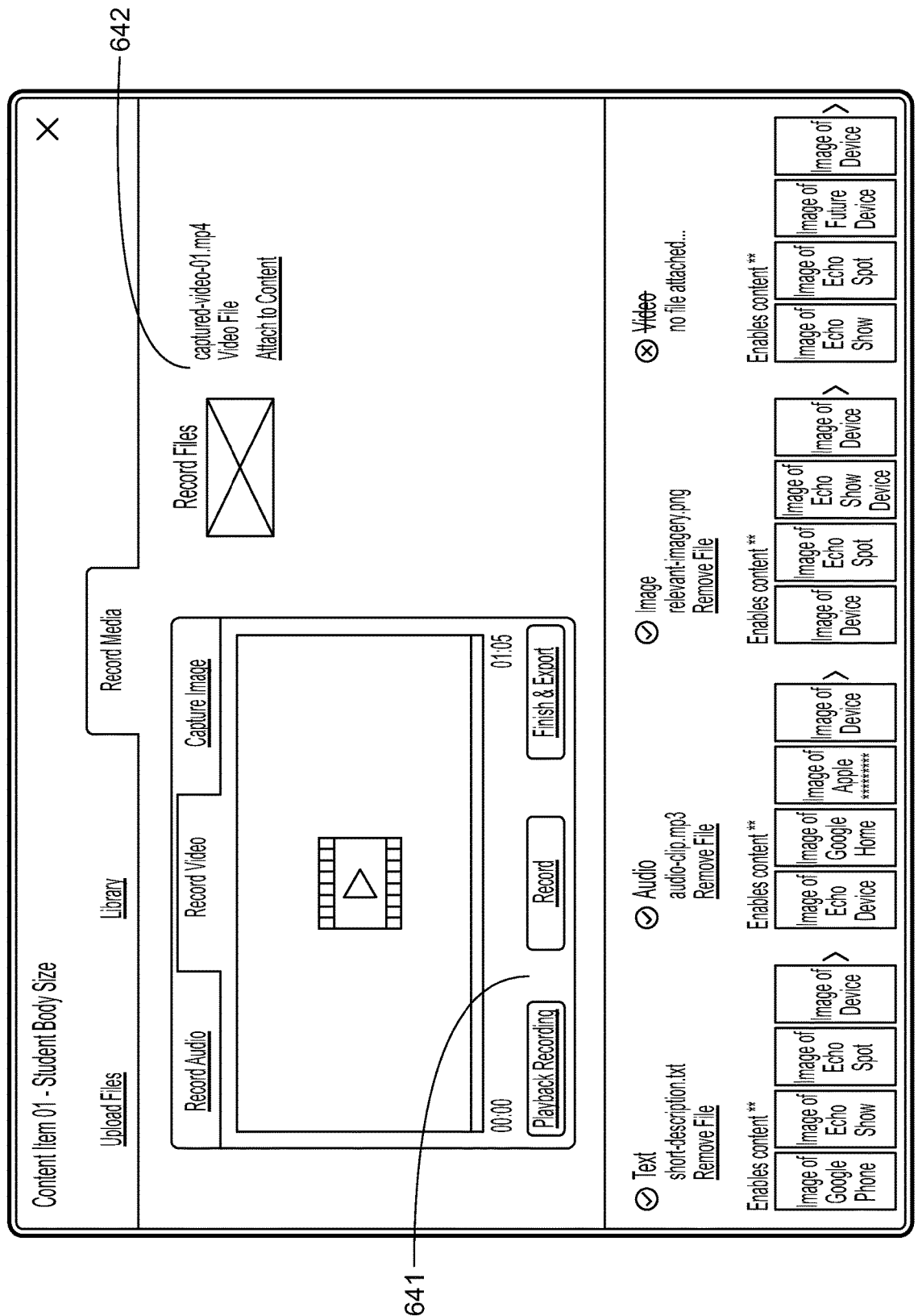

Participant users who choose to include audio or video as part of a message element of a response message can produce the content item directly within the CMS through the user interface of the platform 641. Therefore, as shown in FIGS. 24 and 25, the platform enables platform users both to produce and to manage multiple types of content items in one place 642.

Questions and Answers

The platform is designed to store and provide different phrases and sentences that voice assistant devices can speak, for example, to answer questions of an end user. The alternatives are stored as question and answer sets. As shown in FIG. 22, the CMS interface enables platform users to create collections of questions 621 and answers 623.

Full Multilingual Support

The platform fully supports multilingual content within the voice content management system interface and voice interactions. Since the voice content management system interface supports multiple languages, the interface is accessible to non-English platform users in their native languages.

In some implementations, the platform can support the ability to publish non-English content. To make such an approach useful, instructions and prompts within the interface would also need to be provided in the platform user's native language.

The platform supports multilingual content for voice interactions from the data layer up through the final response messages to the voice assistant devices based on the data model that represents a given item of content. All content items within the platform inherit an object that contains properties for language and version. Therefore, any content item in the system can have corresponding items in other languages. For example, a question in the voice content management system that states "How large is the student body" with a language value of EN-US can have equivalent entries in Spanish and French with language values of ES-ES and FR-FR.

Analytics

Figure 27:
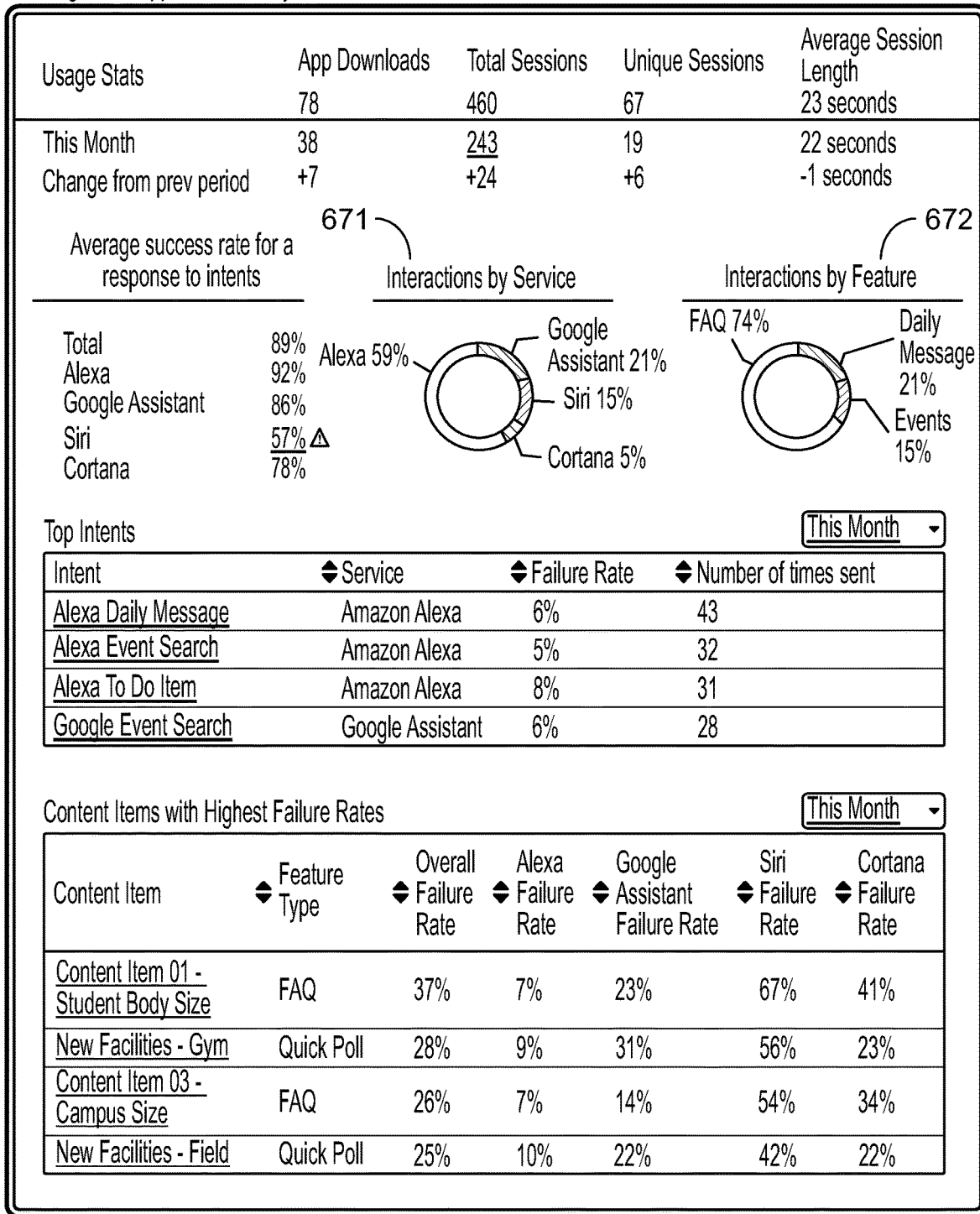
Figure 28:
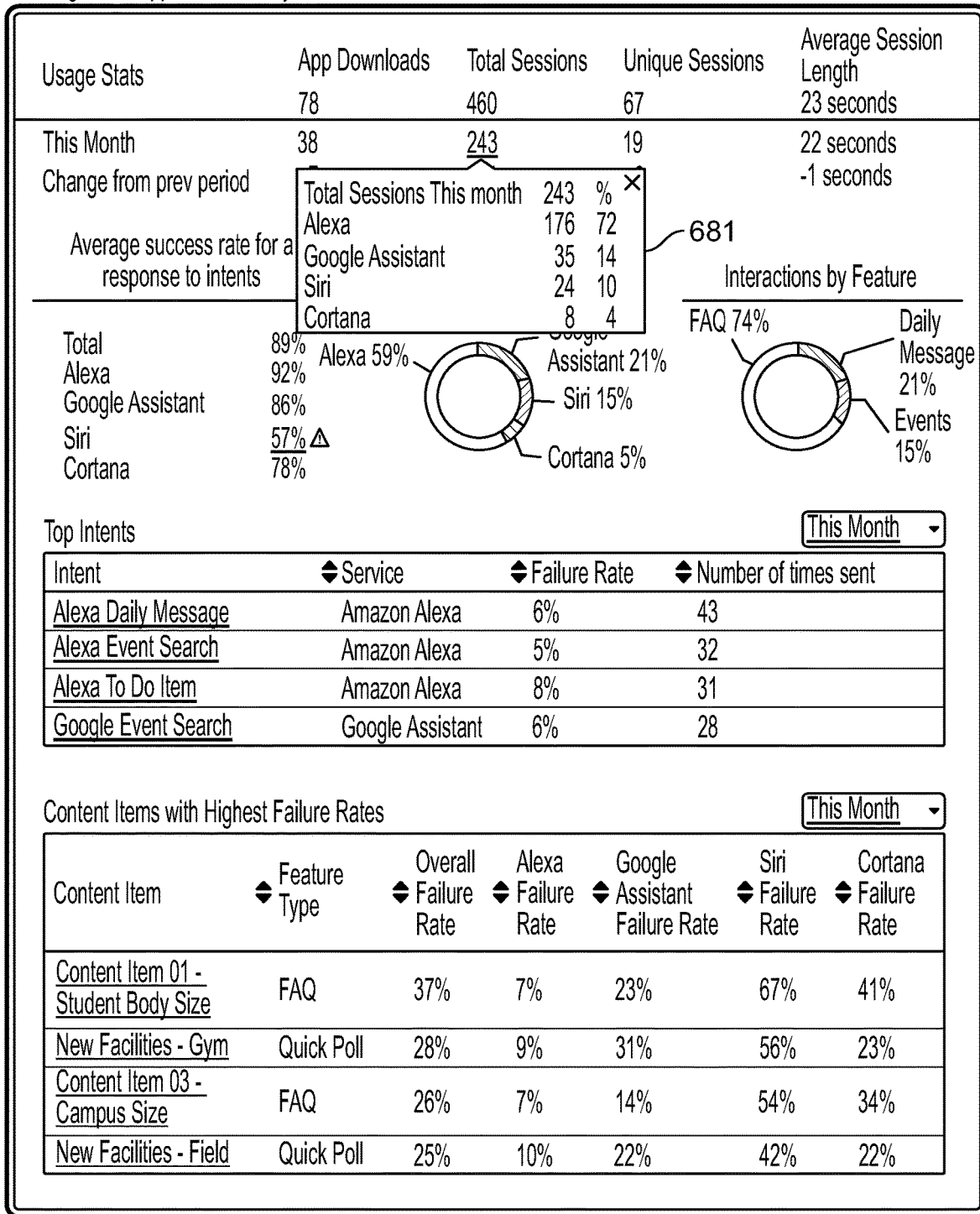

Analytics processes of the platform can analyze usage data representing many different aspects of the operation of the platform and process this large amount of information to provide participant users insight into the performance of their items of content 624, features, modules, and voice applications. As shown in FIGS. 27 and 28, the data analytics can include measurements made across different types (frameworks) of voice assistant devices 671, 681, and different specific voice assistant devices that are the sources of the original request messages, measurements of the types of features that message elements of the request invoke 672, and comparisons of the performances of respective items of content that are used by a given feature. These types of analytics are separate from the analytics that the platform itself consumes to determine the performance of components, aspects, and the entire platform.

Among the key kinds of analytics provided by the platform are data aggregation, data analysis and processing, key performance indicators, and intelligent rendering.

Data Aggregation

Analyzing the performance of items of content is vital to enabling platform participants to create good voice experiences for end users of voice assistant devices. There are points in the data flow where raw data can be analyzed especially effectively for this purpose. The platform applies machine learning approaches to the raw data to classify data into buckets and compare large amounts of the data that aggregate over time.

Among the types of data that the platform analyses are each of the following (and combinations of two or more of them): the type (e.g., framework) of voice assistant from which a request message originated (e.g., Alexa, Google assistant, Apple Siri, Microsoft Cortana, or a custom voice assistant), the type (e.g., framework) of voice assistant device from which a request message came (e.g., Echo Show, Google Home, Mobile Device, Echo Dot, or others), the type of feature that was invoked by the message elements of the request message, the metadata for each processed content item, content items often found together, the success rate of types of message elements of request messages in invoking appropriate features, misses in invoking items of content, information about the end user whose speech initiated the request, information about a related application, raw usage information, time of day, repeat versus new visitor, geographic location and region from which request messages originated, and authenticated end user information, among others.

These items of data can also be related to each other. The relationships of the items of data provide insight into the performance of items of content as noted earlier.

There are certain especially effective places in the flow of the operation of the platform at which the raw analytics data can be collected and there are sub-flows for how it is collected. Once collected, the raw data can be processed into more easily understandable structured data. The effective places for data collection include: the initial receipt of a request message at the API layer, the performance of a content search by a feature server, and the processing of a response message by a voice experience server, among others.

Receipt of Request by Voice Experience API

A request message sent by a voice assistant device to the voice experience server API contains useful raw data. The raw data that is sent will depend on the type of the voice assistant device, although the data sent by many types of voice assistant devices commonly includes: user identifiers, information about the voice assistant device that was the source of the request message, information about the voice assistant that was the source of the request message, and certain data (eg., message elements) contained in the request.

Figure 29:
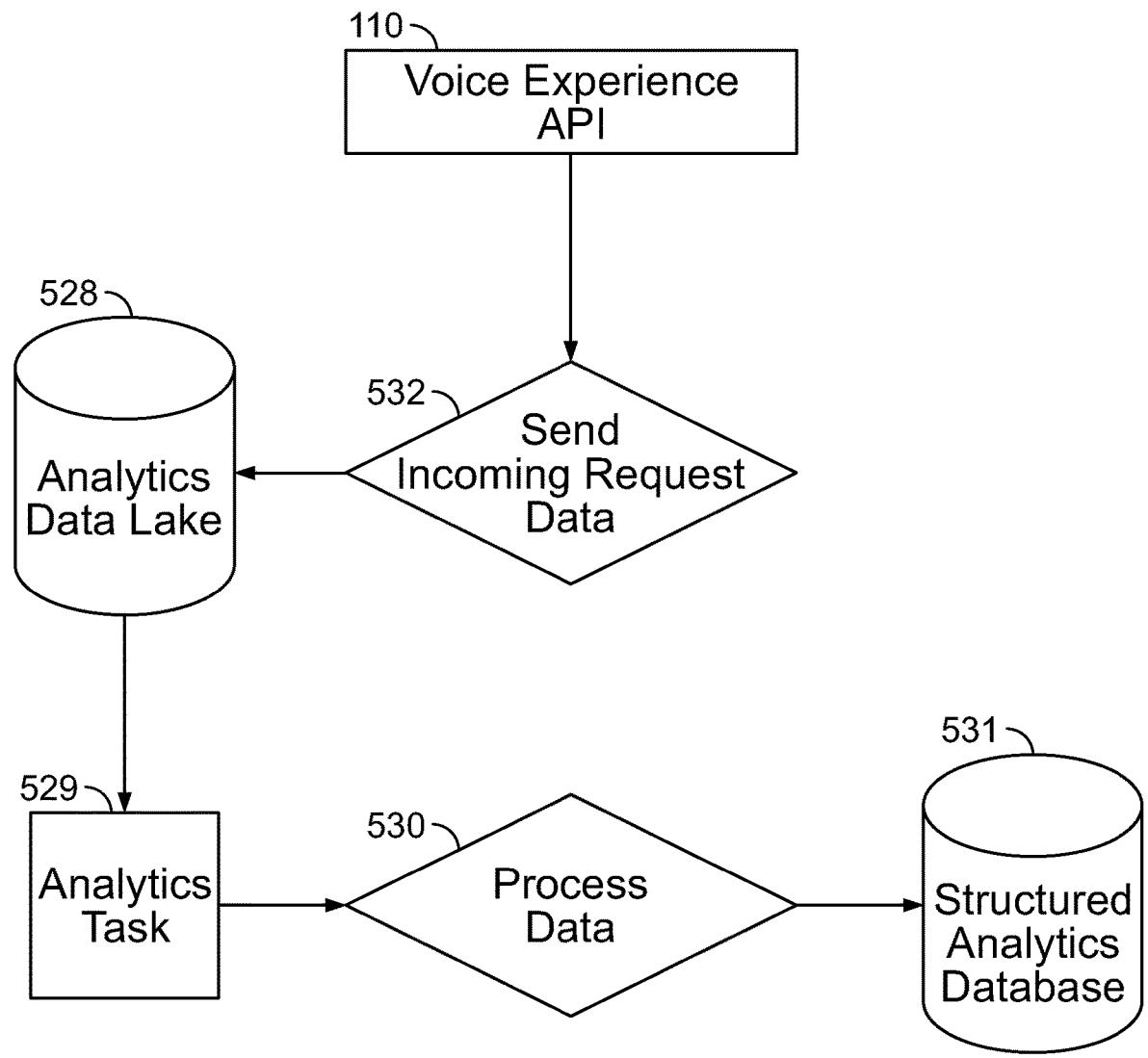

The API layer of the platform translates this raw data to an abstracted form expressed according to a set of protocols shared across different frameworks. As shown in FIG. 29, once the raw data is structured and expressed according to the abstracted protocol, it is sent to an aggregate data store implemented as a data lake 528, for example, where it is stored to be processed 530 later by one or more data analysis processes 529.

Feature Server Content Search

By creating a search index using weights on fields and permitting message elements of request messages to reach multiple feature content results, the platform can track results returned in corresponding response messages and items of content commonly found in the results across multiple request messages. This enables the platform to show to platform participants, through the user interface of the platform, which of their items of content are being used most frequently and which are being missed. The platform participant then can decide to change the wording or structure or other characteristics of items of content or message elements of response messages to produce better results in interacting with end users.

Figure 30:
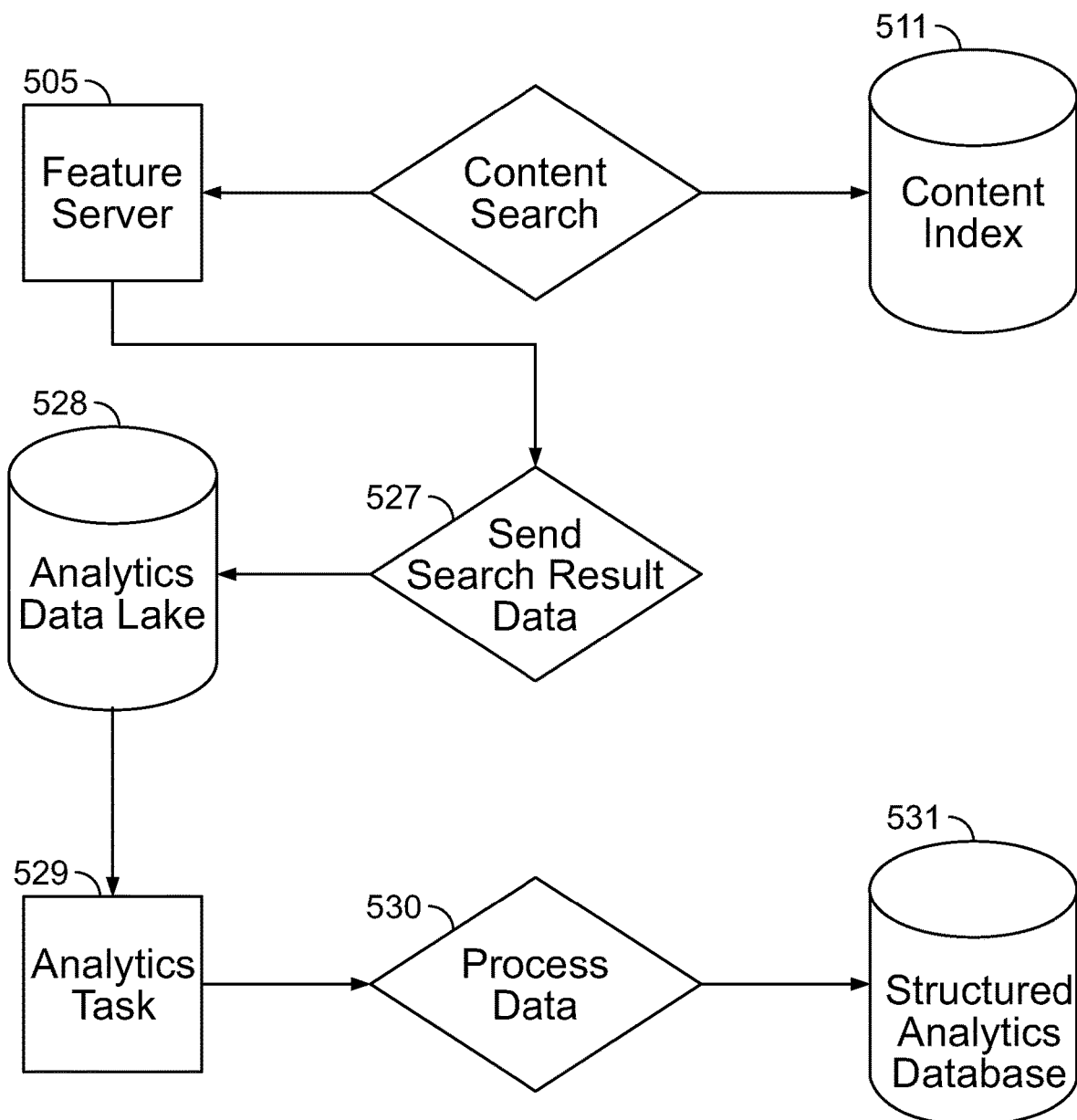

As shown in FIG. 30, when a feature server 505 queries a content index 511 and receives potential results (items of content), the raw potential results 527 can be stored in the data lake 528. The stored data identifies the content items from the search results and related information about the query that returned those results such as the feature service request. The data in the feature service request stored with the search result data relates to the request data initially sent from the API because the feature service request contains the original message element of the request message received from the voice assistant device.

Response Processing

Once the data from the message element of the original request message and the content search results have been stored in the analytics data lake, a message element to be included in the response message can be formulated by translating the feature service response from the feature server to a form that conforms to the protocol expected by the corresponding voice assistant device. The process of generating the message element for the response message is a useful point for accumulating raw data for analytics.

For example, if the data lake 528 contained message elements from a request message, information about the originating voice assistant device, and the request message as well as the response message, the analytics process 529 could combine those datasets into a cleaner and slimmer model 530 to make it easier to show, for example, how many end users use various types of voice assistant devices or how many request messages have generated successful response messages for a certain type of voice assistant device. For example, if the voice application has an Alexa Skill and a Google Action that use the SDK to send message elements of request messages to the voice application, the platform participant could learn how many end users use the Alexa Skill versus the Google Action overall for the voice application and how many end users use Alexa versus Google for a particular feature such as the events feature, or how many end users of two different voice assistant devices ask for a specific item of content.

The analytics process also can track message element types for a given type of voice assistant device that are matched to a given feature, enabling platform participants to consider moving items of content to a custom fallback feature server. Because the original request message contains the original message element type, the analytics process 529 can skip the graph traversal and find the feature directly. For example, if a platform participant notices that a Google Action tends to use a specific message element type that the platform participant does not want to map to the feature to which it is being mapped, the owner can disable that feature and customize where the message element of the request message would go by using a custom fallback feature server or a custom feature server.

The types of analytics discussed above can be considered static analytics and the processing of the data to an abstract structure can be referred to as static data analysis. As discussed later, static data analysis differs from what can be called dynamic data analysis or intelligent data analysis which uses machine learning to understand patterns in the analytics data rather than displaying the data directly.

Once a message element of a request message has been mapped from its raw state stored in the data lake 528 to a more structured form stored in a database 531, the raw data in the data lake can be deleted or moved into a long-term archive by compressing the data into a file and saving it to blob storage or file storage. Archiving certain types of data enables training of new or revised machine learning algorithms without having to re-collect data for training and also acts as a backup against data corruption in the analytics database 531 or data loss.

Machine Learning and Intelligent Suggestions

The analytics engine uses machine learning and large amounts of analytics data to provide analytics and suggestions to platform participants. This dynamic or intelligent data analysis can be used to provide intelligent suggestions to platform participants on how to structure items of content, where to put certain types of content items, which items of content work well, and which do not.

Figure 31:
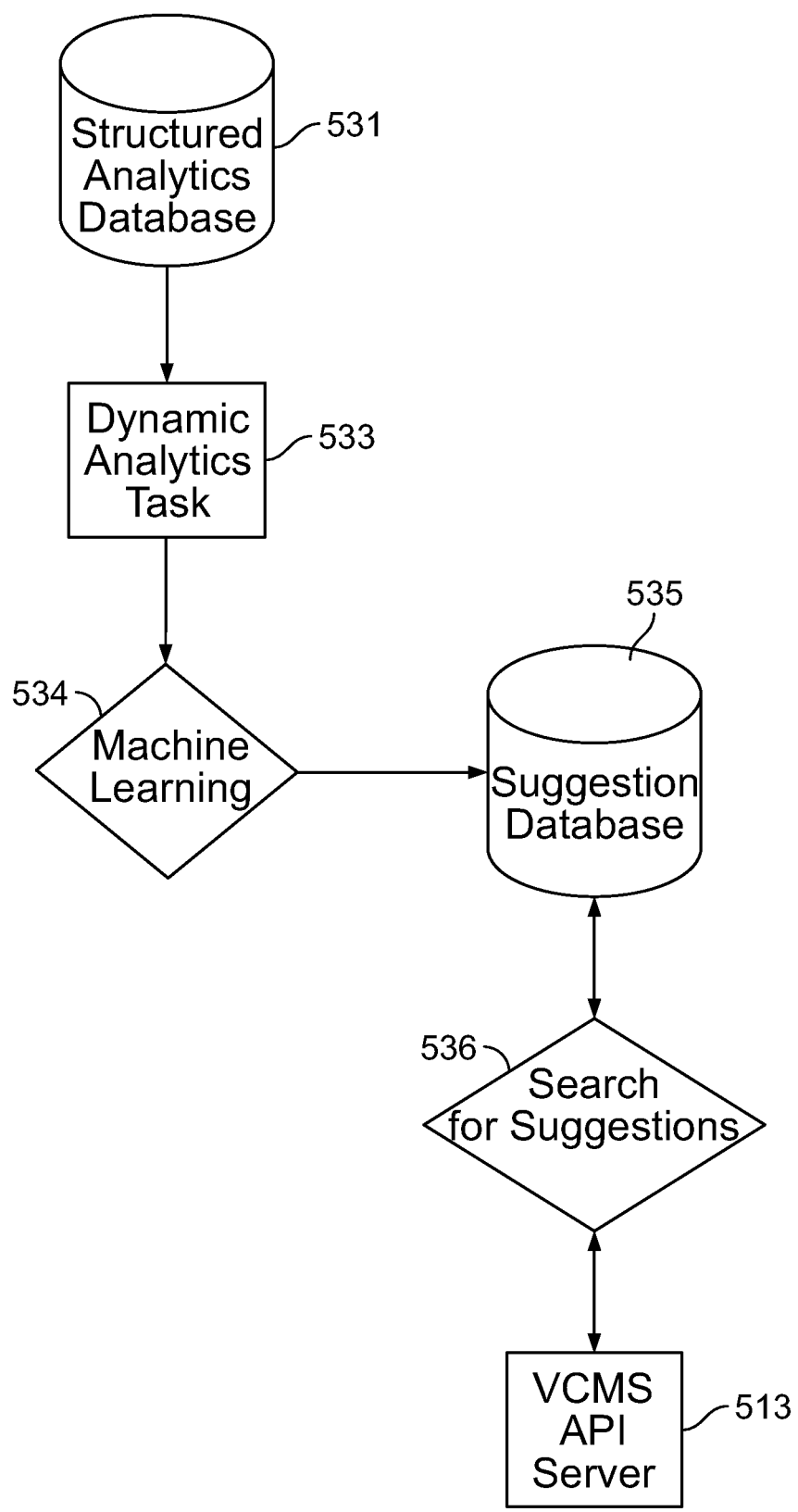

The general flow of processing analytics data, as shown in FIG. 31, includes: store raw data in data lake, draw raw data from the data lake, send raw data to static analysis, send output from static analysis to machine learning 534, store suggestions for platform participants in a separate database 535 to be used later, request suggestions 536 based on output from machine learning algorithms, and render suggestions through the user interface of the platform to platform participants.

Data Analysis and Processing

As shown in FIG. 31, processes within the analytics engine use information generated by post-processing statically analyzed data 531 as well as raw data from pre-processed data lakes to infer relationships and view patterns in these relationships. The algorithms for dynamic analysis 533 are also targeted at particular goals just as the static analysis step is. The goals for dynamic analysis use more than just static data such as usage across devices, success rates, or failure rates. Dynamic analysis uses these statistics about usage and rates to compare certain items of content and features.

Figure 32:
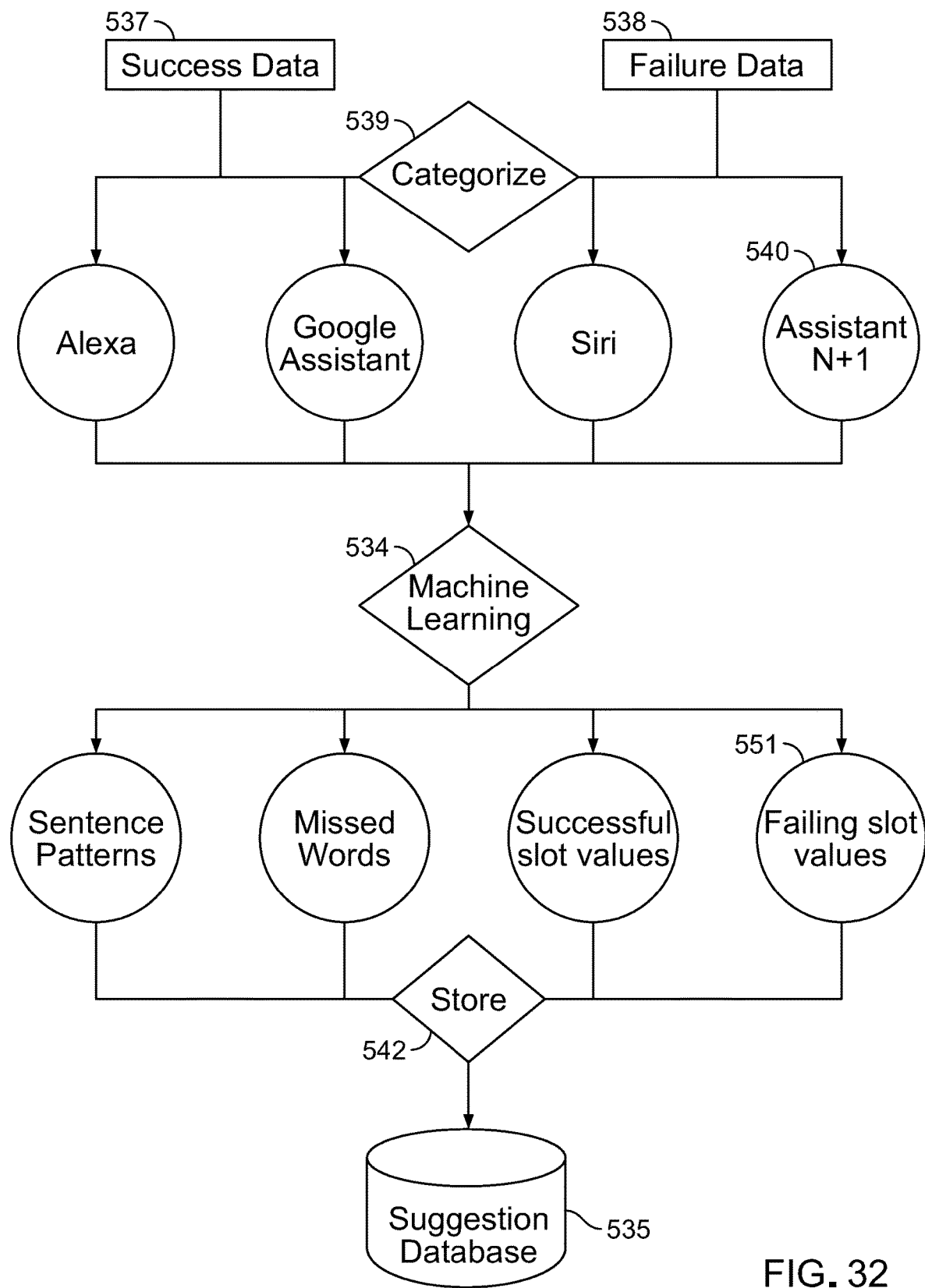

For example, as shown in FIG. 32, dynamic analysis can detect the relative performances of items of content. As dynamic analysis is performed using amounts of aggregated data that grow over time, the dynamic analysis can achieve an increasingly deep understanding of why a particular item of content is working better than others. This result of the dynamic analysis could be information about the sentence structure, types of data within an item of content, the quality of the use of words by the voice assistant, and other factors.

Dynamic analysis of analytics data includes, among other things: gathering data at the voice application level and at the content item level. The data can include, for example: success 537 and failure 538 rates of an item of content in general, success and failure rates for an item of content when presented on a particular type of voice assistant device, comparing which content items are often returned together in feature content searches, and identifying queries in the feature server content searches that are returning common data set results, among others.

A significant difference in the gathering of analytics data between static analysis and dynamic analysis is that static analysis only uses the data within the context of a particular voice application and feature. This limitation arises because the result of static analytics is data that applies only to the particular application and its own features and items of content. Dynamic analysis, by contrast, can use raw data derived from execution of all voice applications of all platform participants at one time. Therefore a given platform participant can use the dynamic analysis of all content items of all voice applications of all platform participants and can receive intelligent suggestions enabling the platform participant to provide end users effective content items.

For example, the dynamic analysis and machine learning executed by the analytics engine of the platform could categorize 539 analytics data of four voice applications of four different platform participants. Suppose the voice applications all use a survey feature, regardless of which module is the source of that feature. In each of the survey feature content areas, each voice application asks a similar question such as "How many Undergraduate Students are there at Hamilton College?" Suppose the question has a set of acceptable answers such as 1878, 1800, about 1800, and eighteen hundred.

Based on this example, static analysis will gather information about how many responses were successful and the types of voice assistant devices or voice assistance 540 that yielded the successes and failures. Say, for example, that a particular type of voice assistant such as Siri has a much higher failure rate than other voice assistants. The analytics engine can gather information on which incorrect answers were provided. During dynamic analysis of these statistics, the analytics engine might detect a large number of failed responses for Siri many of which were "eighteen one hundred." This could suggest that the language processing of a particular type of voice assistant device or voice assistant could perform worse than other types. The end users may actually have been speaking "eighteen-hundred," but Siri interpreted that speech as "eighteen one hundred." Dynamic analysis can track types of words certain voice assistants interpret less accurately than other types of voice assistants and store that information in a structured database just as static analysis does. In this example, the machine learning algorithm 534 would record that "eighteen hundred" is a difficult phrase for Siri to process correctly. With this knowledge, the analytics engine can provide intelligent suggestions to platform participants. Because the analytics engine can use usage data from all four applications of different platform participants, it can store the processed information and provide it to all four platform participants without each of the platform participants having access to private information that was used to train the machine and that was processed for intelligent suggestions.

Intelligent Suggestions

Intelligent suggestions are suggestions derived from data generated by machine learning and dynamic analysis phases of analytics processing and provided to platform participants—on ways to structure or express or change items of content to achieve effective voice experiences by end users when using the platform participants' voice applications and message elements on one or more types of voice assistant devices. These suggestions can include: re-phrasing sentences, removing words, adding wording variations, removing variations, or updating slot values, among others.

The suggestions are generated by sending an HTTP request to the CMS API to request the suggestions when an item of content is being updated. The CMS API checks the database for the latest information on, for example, the success and failure rates of certain words for certain voice assistants or voice assistant devices and returns a collection of suggestions, if there are any. The CMS client (e.g., the analytics process) then renders these suggestions to the platform user through the user interface of the platform to enable the platform user to make changes in wording based on the suggestions or to ignore the suggestions.

Using the example above of the machine learning and dynamic analysis detecting and tracking that Siri has a hard time with certain types of numbers such as "eighteen hundred," suppose a platform participant is creating a new survey question "When was the Declaration of Independence signed?" with accepted answers of 1776, seventeen seventy-six, and seventeen hundred seventy-six. After the participant user enters the items of content representing these answers, the CMS would request suggestions for these items of content. Because the analytics engine knows that Siri will likely speak "seventeen hundred seventy-six" as "seventeen one hundred and seventy-six," it would suggest that the platform participant add another answer variant of "seventeen one hundred and seventy-six" with an explanation that Siri may interpret certain numbers incorrectly and adding this variant will help to ensure that end users of the Apple HomePod will have a better voice interaction experience. For example, as shown in FIG. 33, such a phrase can be presented in the user interface for these intelligent suggestions 631.

Intelligent suggestions can be used for any type of feature or content item because the dynamic analysis can track data across features as well as within the context of a specific feature to provide the best intelligent suggestions.

Another type of intelligent suggestion in addition to suggestions about items of content and suggestions about features is a recommendation to add a particular feature to a voice application. This kind of intelligent suggestion can be derived by tracking which features added to similar voice applications have correlated to more success by their voice applications or more usage. By knowing which features are used most and succeed the most for voice applications in the same industry, for example, the dynamic analysis can track data about these features and modules and suggest to platform participants to add these features and modules.

For example, if there are two voice applications in the higher education industry and one voice application, since adding the survey feature, has experience more usage and higher success rates, the dynamic analysis can detect that this feature is a cause for the greater success of the first voice application and suggest to add a similar feature to the second application accompanied by the reason that other platform participants in their industry are experiencing greater success when including that feature.

Data Layer

The data layer defines the types of storage used by the analytics engine and how those types of storage interact with other parts of business logic or APIs and applications. The primary stores include: a content database, an analytics data lake, an analytics structured database, a file and blob storage, content indices, and a graph database, among others.

Each major store is designed to be scalable using cloud technologies so that they can be replicated across regions of the world, keep data synced, and grow in size and throughput.

Content Database

The content database is responsible for storing data related to managing items of content hosted by the platform. In some implementations, this database is a relational SQL-style database that relates data about platform participants, voice applications, modules, features, items of content, and other data.

The content database is updated through the CMS API using a connection from the CMS server and the database. Requests made to the CMS by a platform participant through the user interface of the platform enable the platform participant to update the items of content.

This database can be implemented as a PostgreSQL database or any other SQL-style database.

File and Blob Storage

The file and blob store can be implemented as a traditional file store in the cloud to enable scalable storage with security. The file and blob store contains files uploaded by platform participants, for example, audio recordings, video files, or images, or combinations of them. Each of these files is associated with a publicly accessible URL to enable the voice assistant devices to access the files, for example, to stream the audio recordings and video files or render the images on voice assistant devices that support those formats.

When a platform participant uploads a file, the file data goes through the CMS API to the file and blob storage. Once the upload is complete, the URL of the file is sent as the reply to the requesting client and a reference to this file's URL is stored in the content database. Platform participants can also remove and update files in this storage using the CMS through the user interface of the platform.

In some implementations, the file and blob store can be implemented as an Amazon Web Services S3 Bucket.

Content Indices

The content indices are a collection of elastic search indexes that contain data from items of content in the content database. The content indices provide better performing content searches for the feature servers. When a query is made against an index from a feature server, a collection of best matching results is returned. The elastic search index enables adding weights to certain properties of a given type of data that is being added to the index as described earlier.

Content items in the content indices are updated by the CMS API when an item of content is added, updated, or deleted by a platform participant.

Graph Database

The graph database stores a graph of the relationships between features, message elements of request messages, and message element slots. The graph database is used during the graph traversal stage of the business logic layer when a request message is received from a voice assistant device. The graph can be traversed using the edges between intents, slots, and features to find the most appropriate feature to use for a message element of a request message from a voice assistant device.

The graph database is updated by the participant users who manage the relationships for new or updated message element types of, for example, Amazon, Google, Apple, and Microsoft.

Analytics Data Lake

The analytics data lake is a large data store for unstructured analytics data. It is used to add foundational information based on request messages that come from voice assistants and content searches from feature servers. The static analysis and dynamic analysis phases and tasks consume the large amounts of data and structure it into smaller and more understandable pieces of information that are valuable to the analytics engine such as usage, success/failure rates, and others Analytics Structured Database The analytics structured database is a SQL-style relational database used by the CMS to show and provide structured analytics data and to store intelligent suggestion data. This database is updated by the data analysis phase after retrieving information from the data lake and mapping it to the structured table relationships that exist in the structured database.

Other implementations are also within the scope of the following claims.

The invention claimed is:

1. A computer-implemented method comprising
exposing user interface features in a user interface of a platform, the platform being for developing voice applications,
the user interface features enabling a user to engage in development of the voice applications, each of the voice applications to include responses to be provided by the voice application to voice assistant devices that conform to one or more different voice assistant frameworks, each of the voice assistant frameworks defining formats for requests for service and formats for responses to the requests for service, the requests being based on speech of end-users spoken to the voice assistant devices, at least some of the responses being expressed as audible speech by the voice assistant devices to the end-users, the responses including items of content,
the user interface features exposed in the user interface of the development platform enabling the user to select and manage the items of content to be included in the responses,
in real time while the items of content are being selected and managed by the user while engaged in development of the voice applications, exposing through the user interface, information about effectiveness of one or more of the items of content, and executing the voice application to generate the responses including the selected and managed items of content.

2. The method of claim 1 comprising
aggregating usage data from the voice assistant devices that conform to the two or more different voice assistant frameworks, and
generating the information about the effectiveness of the one or more items of content from the aggregated usage data.

3. The method of claim 2 in which the usage data is aggregated through a universal API applicable to the two or more different voice assistant frameworks.

4. The method of claim 2 in which the information about the effectiveness is generated by a machine learning algorithm.

5. The method of claim 1 comprising
receiving through a communication network from voice assistant devices that conform to one or more of the different voice assistant frameworks, requests for service, the requests being based on speech of end-users, the speech of the end users expressing intents,
the responses configured to be sent through the communication network to the voice assistant devices to cause them to respond to the respective end users,
evaluating measures of the effectiveness of the responses, and
based on the relative measures of effectiveness of the responses enabling a user through the user interface of the platform to manage subsequent responses to requests for service.

6. The method of claim 5 in which the voice assistant devices from which the requests are received conform to two or more different voice assistant frameworks.

7. The method of claim 5 comprising
presenting suggested responses to the user of the platform through the user interface of the portal based on the evaluated measures of effectiveness and enabling the user to select responses to be sent to the voice assistant devices based on the suggested responses.

8. The method of claim 5 in which evaluating measures of the effectiveness comprises evaluating effectiveness of items of content included in the responses across two or more of the different voice assistant frameworks.

9. The method of claim 5 in which evaluating measures of the effectiveness comprises evaluating effectiveness of the responses relative to the respective voice assistant frameworks of the voice assistant devices to which the responses are to be sent.

10. The method of claim 5 in which evaluating measures of the effectiveness comprises evaluating effectiveness of the responses relative to two or more different voice applications configured to receive the requests and determine the responses.

11. The method of claim 5 comprising managing items of content to be carried in subsequent responses based on the measures of effectiveness.

12. The method of claim 1 comprising
receiving through a communication network from voice assistant devices that conform to one or more different voice assistant frameworks, requests for service based on speech of end-users, the speech of the end users expressing intents,
the responses configured to be sent through the communication network to the voice assistant devices to cause them to respond to the respective end users
the items of content included in a given one of the responses being selected from alternative possible items of content, the selection of the items of content to be included in the given response being based on a context of the expressed intent of an end user.

13. The method of claim 12 in which the voice assistant devices from which the requests are received conform to two or more different voice assistant frameworks.

14. The method of claim 12 in which one of the voice assistant frameworks comprises a chatbot framework.

15. The method of claim 12 in which the context of the expressed intent of the end user comprises a geographic location of the voice assistant device to which the response is to be sent.

16. The method of claim 12 in which the context of the expressed intent of the end user comprises demographic characteristics of the end user.

17. The method of claim 16 in which the demographic characteristics comprise age.

18. The method of claim 16 in which the demographic characteristics comprise linguistic characteristics inferred from a geographic location of the voice assistant device to which the responses to be sent or inferred from characteristics of words contained in the received requests.

19. The method of claim 18 in which the linguistic characteristics comprise an accent.

20. The method of claim 18 in which the linguistic characteristics comprise local colloquialisms or local references.

21. The method of claim 16 in which the demographic characteristics comprise gender.

22. The method of claim 16 comprising end user preferences based on which the items of content to be included in the given response can be selected.

23. The method of claim 1 comprising
configuring the user interface of the platform to enable development of voice applications for processing requests received from voice assistant devices and for generating the responses for the voice assistant devices to present to end users,
maintaining modules of features to which the requests can be matched to generate the responses,
including in each of the modules, a set of features that correspond to contexts in which the responses will be presented to the end users,
the maintaining of the modules comprising (a) maintaining standard modules for corresponding contexts, and (b) enabling generation and maintenance of custom modules of features to which the requests can be matched to generate custom responses for the voice assistant devices, and
exposing the modules through the user interface of the platform.

24. The method of claim 23 comprising
maintaining items of content to be used with the features in generating the responses,
the maintaining of the items of content comprising (a) maintaining standard items of content, and (b) enabling generation and maintenance of custom items of content to be used with the features to generate custom responses for the voice assistant devices.

25. The method of claim 23 in which the contexts relate to products or services in a defined market segment.

26. The method of claim 23 in which the contexts relate to demographics of target groups of end users.

27. The method of claim 23 in which the contexts relate to capabilities of the voice assistant devices.

28. The method of claim 23 in which the contexts relate to types of content items to be used with the features in generating the responses.

* * * * *

UNITED STATES PATENT AND TRADEMARK OFFICE
CERTIFICATE OF CORRECTION

PATENT NO. : 10,636,425 B2
APPLICATION NO. : 16/000799
DATED : April 28, 2020
INVENTOR(S) : Robert T. Naughton et al.

It is certified that error appears in the above-identified patent and that said Letters Patent is hereby corrected as shown below:

On the Title Page

Column 2, (56) under OTHER PUBLICATIONS, Line 1, after "Converse", delete "Amazon Alexa,"

Column 2, (56) under OTHER PUBLICATIONS, Line 2, after "for" insert -- Amazon Alexa, --

In the Claims

Column 41, Line 65, in Claim 12, after "users" insert -- , --

Signed and Sealed this
Twenty-third Day of June, 2020

Andrei Iancu
*Director of the United States Patent and Trademark Office*